United States Patent
Agler et al.

(12)
(10) Patent No.: US 6,513,876 B1
(45) Date of Patent: Feb. 4, 2003

(54) MULTIPLE FUNCTION BOAT SEAT

(76) Inventors: Gayle D. Agler, 740 N. 10$^{th}$ St., Decatur, IN (US) 46733; Patricia Agler, 740 N. 10$^{th}$ St., Decatur, IN (US) 46733

(*) Notice: Subject to any disclaimer, the term of this patent is extended or adjusted under 35 U.S.C. 154(b) by 0 days.

(21) Appl. No.: 09/716,133

(22) Filed: Nov. 17, 2000

(51) Int. Cl.$^7$ ................................................ B60N 2/02
(52) U.S. Cl. ........................ 297/378.14; 297/378.12
(58) Field of Search ...................... 297/378.12, 378.1, 297/378.14

(56) References Cited

U.S. PATENT DOCUMENTS

| | | |
|---|---|---|
| 3,594,039 A | 7/1971 | Harp |
| 4,113,308 A | 9/1978 | Werner et al. |
| 4,484,779 A | 11/1984 | Suzuki |
| 4,775,187 A | 10/1988 | Herr |
| 5,029,929 A | 7/1991 | Sjostrom et al. |
| 5,052,748 A | 10/1991 | Fourrey et al. |
| 5,511,853 A | 4/1996 | Wallis |
| 5,558,403 A * | 9/1996 | Hammoud et al. |
| 5,658,047 A * | 8/1997 | Ratza et al. |
| 6,139,104 A * | 10/2000 | Brewer |
| 6,196,629 B1 * | 3/2001 | Onishi et al. |

FOREIGN PATENT DOCUMENTS

EP  0 179 748  4/1986

* cited by examiner

*Primary Examiner*—Milton Nelson, Jr.
(74) *Attorney, Agent, or Firm*—Baker & Daniels

(57) ABSTRACT

The boat seat has a seat back and seat base connected by a pivot. The pivot has a back arm, a base arm and a middle arm connected between the back and base arms. The pivot utilizes several implementations including but not limited to, a lock pin embodiment, a latch embodiment, a single lock bar embodiment, a single gear embodiment and a double gear embodiment. The pivot enables the seat, without any initial limiting position and in virtually any direction and in any order, to be tilted and locked into multiple positions including but not limited to, a vertical position supporting a fully seated person, a horizontal position supporting a semi standing person or providing the front surface of seat back as a shelf, or a folded position for convenient storage and transport.

41 Claims, 23 Drawing Sheets

FIG. 5A
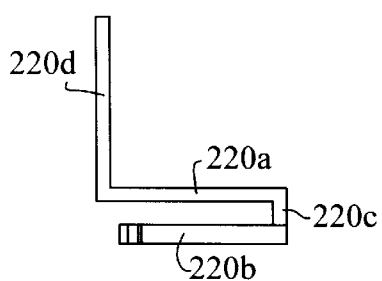
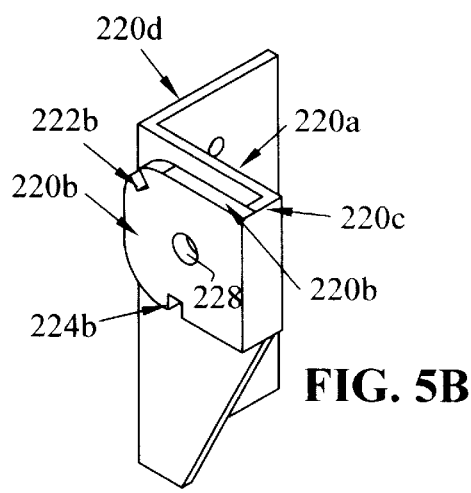
FIG. 5B
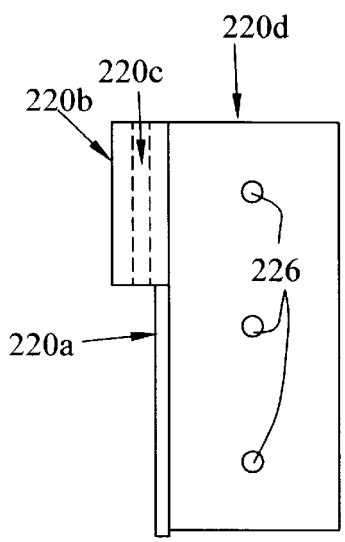
FIG. 5C
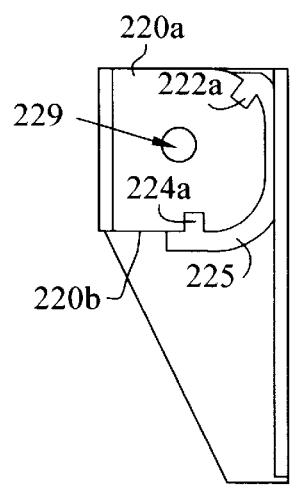
FIG. 5D

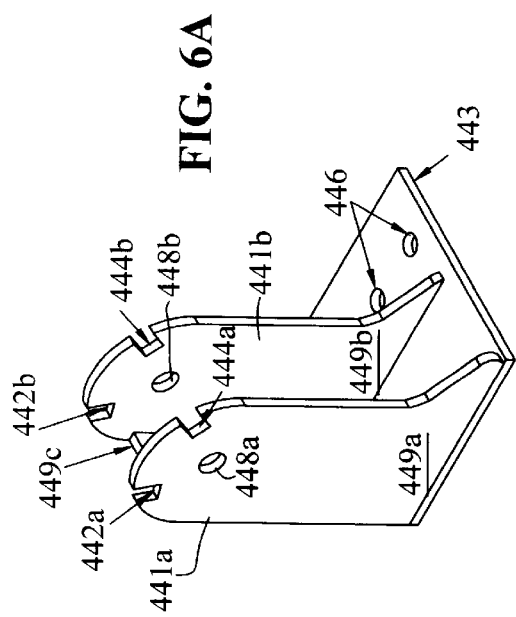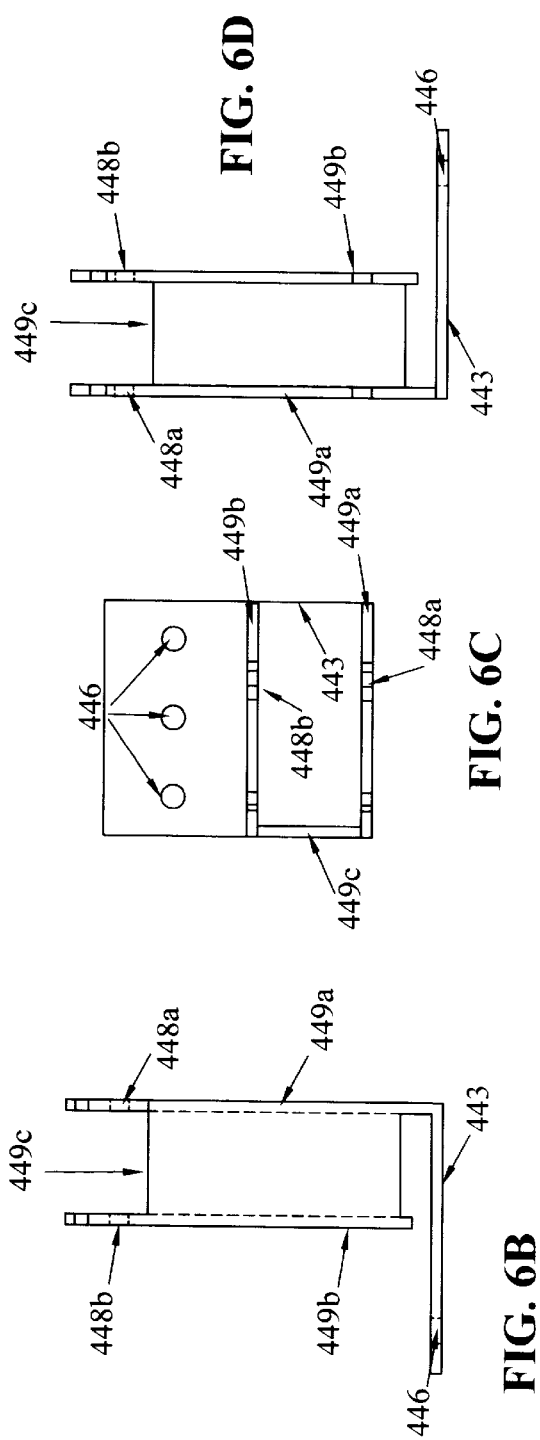

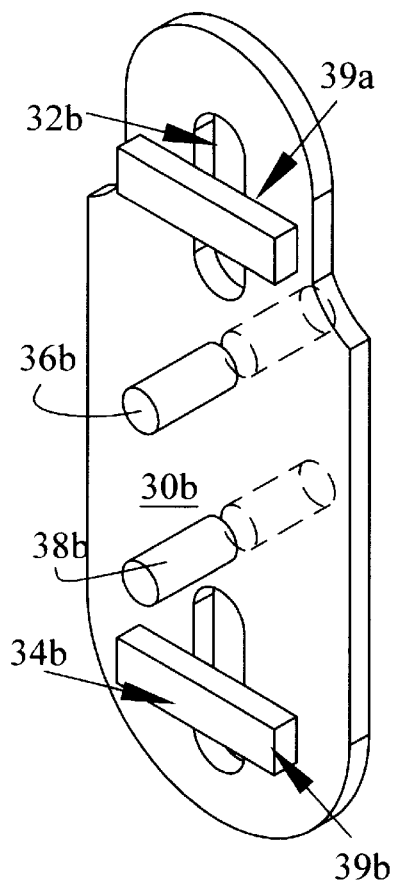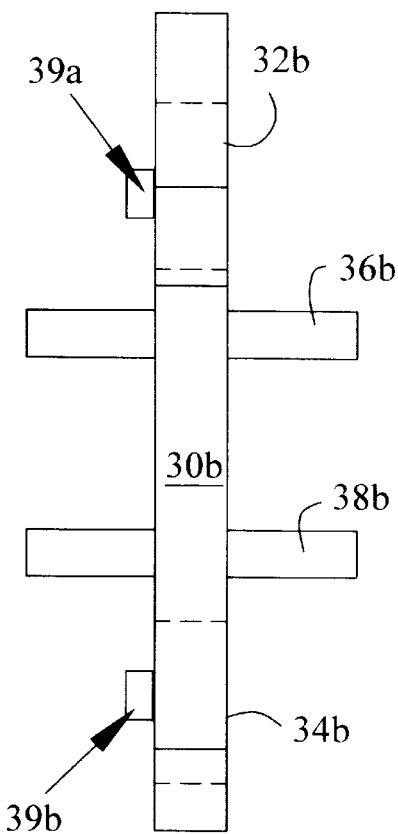
FIG. 10A  FIG. 10B

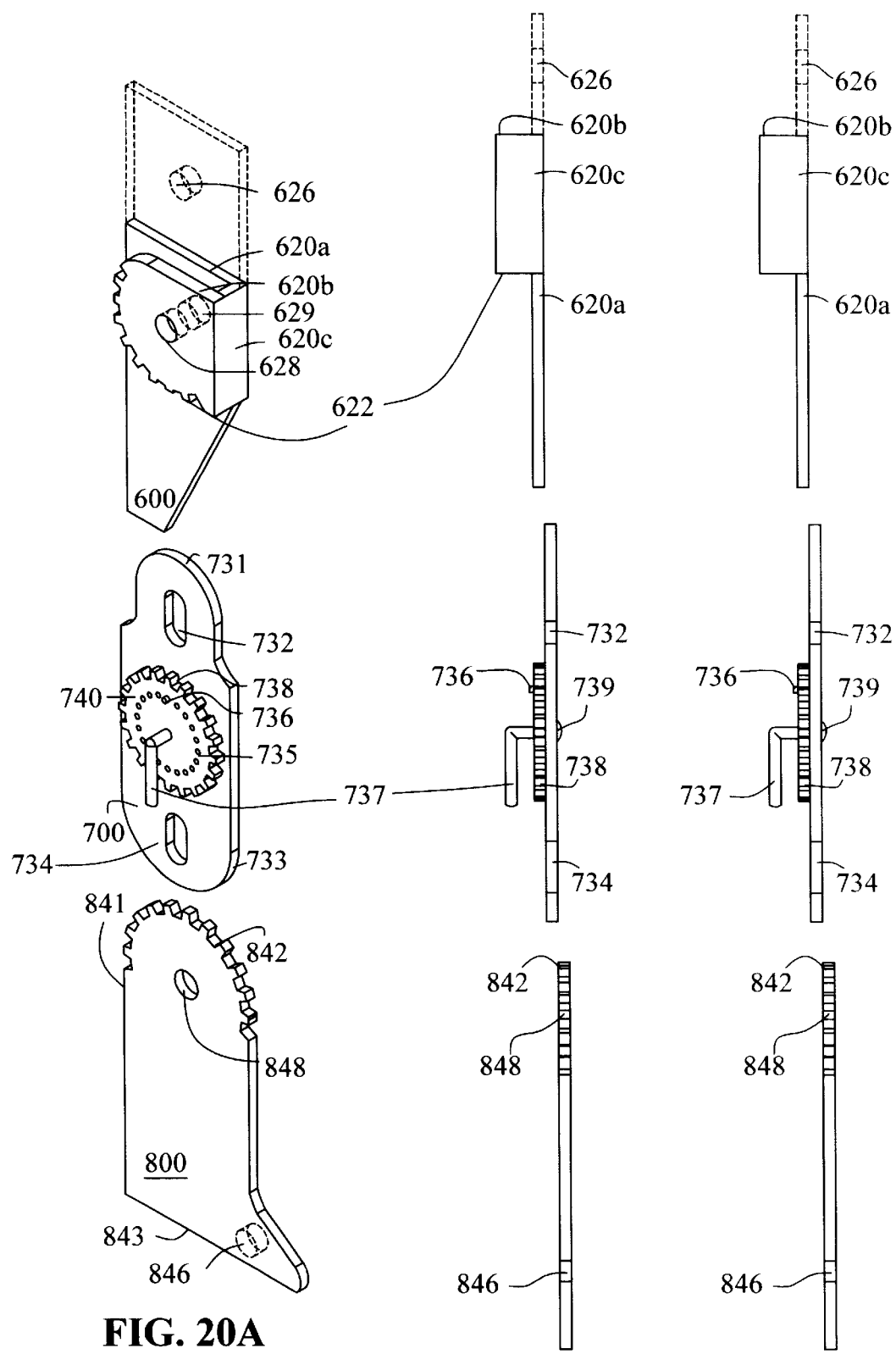
FIG. 20A  FIG. 20B  FIG. 20C

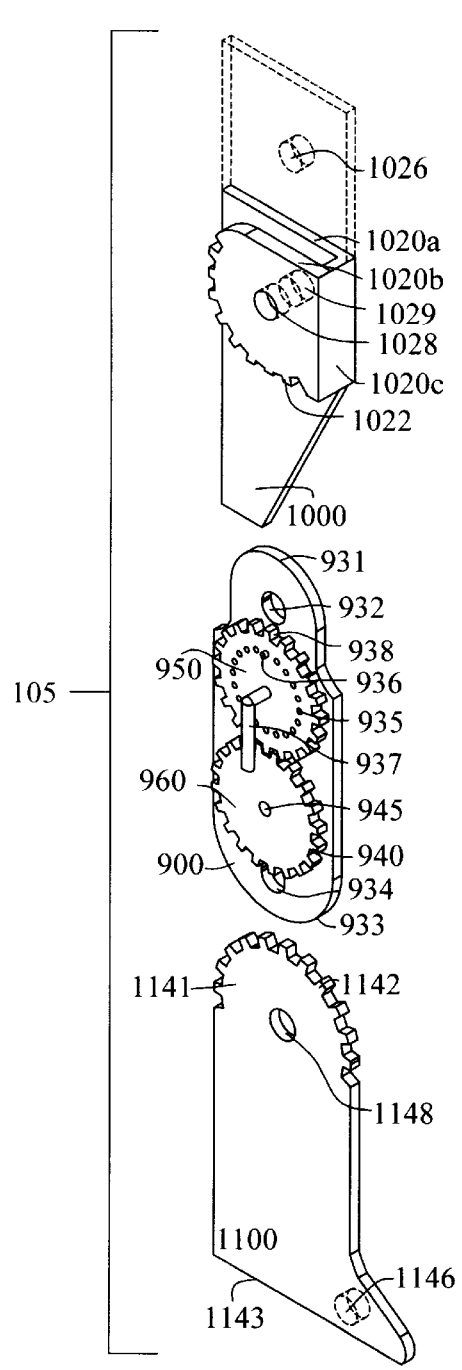
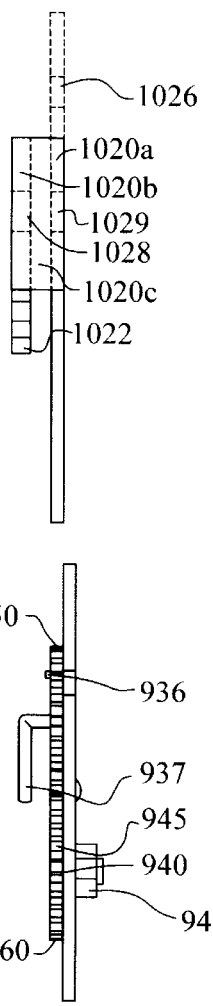
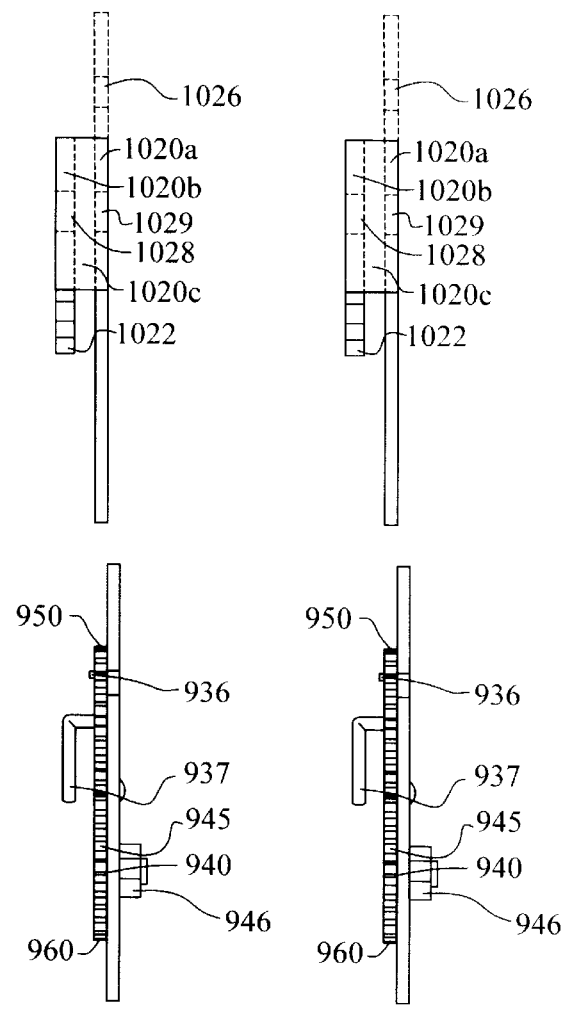
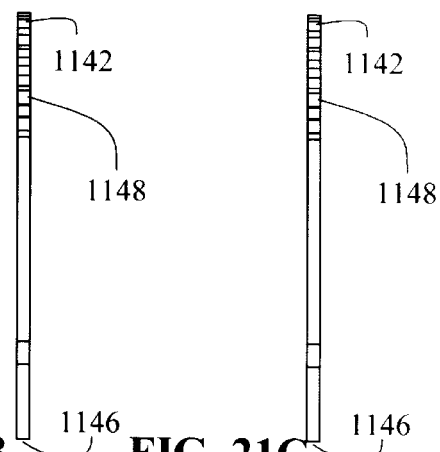
FIG. 21A   FIG. 21B   FIG. 21C

MULTIPLE FUNCTION BOAT SEAT

BACKGROUND OF THE INVENTION

1. Field of the Invention

The present invention relates generally to an adjustable boat seat.

2. Background Art

Fishing boats may include a seat which supports a person who is substantially standing, and another seat which allows a person to be fully seated. If a person gets tired of sitting or standing and he wants to change from one position into another, he must either walk on the boat from one chair to another, or remove one type of seat and install another type. In either case, the procedure may be time consuming and dangerous, because a person may slip off while walking between the chairs, or the person may trip over the seat not in use at the time. Therefore, there is a need for a boat seat arrangement that can provide both the functions more efficiently and conveniently.

SUMMARY OF THE INVENTION

The present invention combines the functions of the two chairs into a single chair arrangement. In addition, the present invention also has a function to use the front surface of the seat back as a shelf when the seat back is in a horizontal position. Further, the present invention also has the ability to fold down for convenient storage and transport. The seat may be optionally mounted on a boat.

An object of the invention is to provide for a seat that has multiple functions. The seat has basically two cushions: the upper seat back and lower seat base that are connected by a pair of pivotable support arms. The seat back has a front surface, an upper and a lower edge. The boat seat may tilt without any initial limiting position and in virtually any direction and in any order. Further, both the seat back and base may tilt relatively to each other so that a person may be fully seated or be substantially standing against the seat back. Additionally, the seat may also pivot so as to make it possible to convert the boat seat into a shelf by titling the seat back into horizontal position. An additional object of the invention is to make it possible to fold the seat back and base towards each other closely so that the seat may be conveniently transported and stored.

The boat seat through a pivot arm mechanism can be manipulated to a semi folded position, where the seat back provides a high top support for a user who is substantially standing against it. Located substantially at the center position on the edge of the lower end, the lower edge has an extending forward center portion between which a user may lay upper thighs to enhance the stability of a semi standing position. The seat can be arranged to have the upper cushion, namely the seat back, be substantially vertical whereby a user may be fully seated. The seat can also be arranged to have the seat back be substantially horizontal whereby providing as a shelf on the front surface of the seat back. The seat can also be completely folded down by rotating the upper and lower cushions towards each other whereby the seat can be conveniently transported and stored. A number of pivotable support arm mechanisms may be used as long as such mechanisms rotate and lock the pivotal cushions in different angles including from a vertical to a horizontal position and vise versa.

In one implementation, the pivot arm mechanism comprises a first back arm, a first middle arm and a first base arm where the first back arm is pivotably connected through a screw or rivet to one end portion of the first middle arm which is in turn pivotably connected at its other end portion through another screw or rivet to a head portion of the first base arm.

The first back arm has two substantially parallel plates connected along a small peripheral edge whereby forming a substantially equal distance space in which a first end portion of the first middle arm may be inserted. One plate of the first back arm is longer than the other, whereas the longer plate provides an extension area for fastening a seat back cushion, while the shorter plate is substantially round shaped having at least two recessed portions on its round edge. Obviously, the more apart the two end recessed portions are, the bigger the angular degree will be, therefore, the closer the seat back and seat base may be folded. There are a first and a second openings through both the longer and shorter plates respectively along the same axis and are located at the geometrical center of the shorter plate.

In a first alternative implementation for the first back arm, the first alternative back arm is formed in a one-piece material separated by and bent along three parallel separation lines. It forms two substantially parallel plates connected along a small peripheral edge whereby forming a substantially equal distance space in which a first end portion of the first middle arm may be inserted. One plate of the first back arm is longer than the other and the longer plate bends 90 degrees to provide an extension area for fastening a seat back cushion, while the shorter plate is substantially round shaped having at least two recessed portions on its round edge. Obviously, the more apart the two end recessed portions are, the bigger the angular degree will be, therefore, the closer the seat back and seat base may be folded. There are a first and a second openings through both the longer and shorter plates respectively along the same axis and are located at the geometrical center of the shorter plate. The longer plate has a semicircular slot geometrically centered at the first opening with a recessed portion towards each end corresponding to and paired the recessed portions on the short plate.

The first base arm is an L-shaped plate with top portion being substantially round shaped with a first opening at the geometrical center of the round portion and having at least two recessed portions on the round portion edge. Obviously, the more apart the two end recessed portions are, the bigger the angular degree will be, therefore, the closer the seat back and seat base may be folded. The base portion of the first base arm provides an extension area for fastening the seat base cushion. A tilt-and-lock mechanism resides basically on the first middle arm.

In a first alternative implementation for the first base arm, the first alternative base arm is formed in a one-piece material separated by and bent along three separation lines, two of which are parallel and perpendicular to the third separation line. It has two identical parallel plates connected on one side whereby forming a substantially equal distance space in which a second end portion of the first middle arm may be inserted. One of the parallel plates has an extended area bent 90 degrees thus providing an extension for fastening the seat base. This alternative first base arm is L-shaped with both top portions of the parallel plates being substantially round shaped with a pair of first openings at the geometrical center of the round portions and having at least two pairs of recessed portions on the round portion edges with each recessed portion of the pair being located at the same location.

In the first implementation, the first middle arm is a long plate having a slot on each end portion and, on same side surface, having one lock pin next to each slot but on the inner side towards the center of the long plate, both lock pins protruding only on the same side surface of the first middle arm. Through the first and second openings on the first back arm and the first slot on the first middle arm, the first back arm and first middle arm are engaged by a mounting screw or rivet through which the first middle arm may freely rotate and slide along the first slot. Similarly, through a second slot on the first middle arm and the first opening on the first base arm, the first middle arm and first base arm are engaged by a mounting screw or rivet through which the first base arm may freely rotate and slide along the second slot. This lock pin type pivot arm mechanism allows the first back arm and first base arm be tilted, without any initial limiting position and in virtually any direction and in any order, and be locked into any position where the recesses are located by moving the lock pins into corresponding recessed portions on the first back arm and first base arm respectively.

In a first alternative implementation for the lock pin type pivot arm mechanism, a first and second locking coil springs are attached between the first mounting screw (or rivet) and first lock pin and between the second mounting screw (or rivet) and second lock pin whereby holding the lock pins in place.

In a second alternative implementation of the lock pin type pivot arm mechanism, a single locking coil spring is attached between the first mounting screw (or rivet) and the second mounting screw (or rivet) whereby holding the lock pins in place.

In a first alternative implementation for the first middle arm, the first alternative middle arm is identical to the above mentioned first middle arm except that there is a piece of elastic material affixed onto the first middle arm across each sliding slot to keep mounting screw or rivet from sliding inside the slot thus keeping the lock pin in place.

In yet another second alternative implementation for the first middle arm, the second alternative first middle arm is identical to the above mentioned first alternative first middle arm except that both the lock pins are protruding on both side surfaces of the first middle arm.

In another implementation, the seat uses the identical first back arm and a first base arm as in the first implementation but with a different middle arm, namely, a second middle arm. In this alternative embodiment, the second middle arm is a long plate having an opening near each end portion. Through the first openings on the first back arm and a first opening on the second middle arm, the first back arm and second middle arm are engaged by a mounting screw through which the second middle arm may freely rotate. Similarly, through a second opening on the second middle arm and the first opening on the first base arm, the second middle arm and the first base arm are engaged by a mounting screw through which the first base arm may freely rotate.

On one side surface of the second middle arm, a first L-shaped latch is mounted at its first end by a mounting screw onto the second middle arm near the first opening of the second middle arm such that the first L-shaped latch may pivotably rotate and being able to latch upwardly into one of the recesses on the first back arm. A rotating lever is mounted substantially at its middle section by a mounting screw onto the center position of the second middle arm such that the rotating lever may pivotably rotate. On the same side surface, a second L-shaped latch is mounted at its first end by a mounting screw onto the second middle arm near the second opening of the second middle arm such that the second L-shaped latch may pivotably rotate and being able to latch downwardly into one of the recesses on the first base arm. A first upper coupling bracket is connected by bolts between a first end portion of the rotating lever and near the notch position of the first latch. Similarly, a first lower coupling bracket is connected by bolts between a second end portion of the rotating lever and near the notch position of the second latch. The first and second latches, the rotating lever and the first upper and first lower coupling brackets form a latch type rotate-and-lock device whereby the first and second latches may lock or release, upwardly and downwardly, into the recesses on the first back arm and first base arm respectively, when a clock wise or counter clock wise force is applied pivotably, depending upon the initial position when the rotating lever is connected with the coupling brackets. Optionally, a handle connected to the rotating lever may be added to help user to use the latch type tilt-and-lock device more easily.

In yet another implementation, the seat uses the identical first back arm and first base arm as in the first implementation but with a different middle arm, namely, a third middle arm. In this alternative embodiment, the third middle arm is a long plate having a slot near each end portion and, having one straight lock bar placed on the center position of the third middle arm extending next to each slot and along the axis connecting the two slots. Through the first and second openings on the first back arm and the first slot on the third middle arm, the first back arm and third middle arm are engaged by a mounting screw through which the third middle arm may freely rotate and slide along the first slot. Similarly, through a second slot on the third middle arm and the first opening on the first base arm, the third middle arm and first base arm are engaged by a mounting screw through which the first base arm may freely rotate and slide along the second slot. This single lock bar type pivot arm mechanism allows the first back arm and first base arm be tilted, without any initial limiting position and in virtually any direction and in any order, and be locked into any position where the recesses are located by moving the single lock bar into corresponding recessed portions on the first back arm and first base arm respectively.

In yet another implementation, a second back arm and a second base arm are essentially the same as those used in the above mentioned implementations, except that in this implementation, the second back arm and second base arm have multiple recessed portions to receive a gear mechanism. In this implementation, a fourth middle arm is a long plate having an opening near each end portion, and having a first round gear placed on the center position of the fourth middle arm. The first gear has a handle bar perpendicularly connected at the center position of the first gear for ease of operation. The first gear is connected to the fourth middle arm through an extendable pin mechanism so that the first gear may be pulled or pushed perpendicularly, outwardly or inwardly to disengage or engage the single gear lock mechanism respectively. There are multiple receiving cavities on the first gear surrounding its center along an equal radius line to receive a third lock pin which is connected to the fourth middle arm along the same radius line and on the same side surface where the first gear is placed. Through the first and second openings on the second back arm and the first opening on the fourth middle arm, the second back arm and fourth middle arm are engaged by a mounting screw through which the fourth middle arm may freely rotate. Similarly, through a second opening on the fourth middle arm and the first opening on the second base arm, the fourth middle arm and second base arm are engaged by a mounting screw through which the second base arm may freely rotate. When the first gear is pulled out and disengaged, this single gear pivot arm mechanism allows the second back arm and second base arm be tilted without any initial limiting position and in virtually any direction and in any order and, be locked into any position where the recesses are located by engaging the first gear inwardly and placing the third lock pin into one of the receiving cavities on the first gear.

In yet another implementation, a third back arm and a third base arm are the same as those used in the above mentioned single gear implementation except that the spacing of the multiple recesses may be different due to different gear diameters. In this implementation, a fifth middle arm is a long plate having an opening near each end portion and, having a second and third round gear engaged with each other and placed on the fifth middle arm such that the second and third gears may engage with the multiple recesses on the third back and third base arms respectively. Through the first and second openings on the third back arm and the first opening on the fifth middle arm, the third back arm and fifth middle arm are engaged by a mounting screw through which the fifth middle arm may freely rotate. Similarly, through a second opening on the fifth middle arm and the first opening on the third base arm, the fifth middle arm and third base arm are engaged by a mounting screw through which the third base arm may freely rotate. The second gear has a handle bar perpendicularly connected at the center position of second gear for ease of operation. The second gear is connected to the fifth middle arm through an extendable pin mechanism so that the second gear may be pulled or pushed perpendicularly, outwardly or inwardly to disengage or engage the double gear lock mechanism respectively. There are multiple receiving cavities on the second gear surrounding its center along an equal radius line to receive a fourth lock pin which is connected to the fifth middle arm along the same radius line and on the same side surface where the second gear is placed. When the second gear is pulled out and disengaged, this double gear pivot arm mechanism allows the third back arm and third base arm be tilted without any initial limiting position and in virtually any direction and in any order and, be locked into any position where the recesses are located by engaging the second gear inwardly and placing the fourth lock pin into one of the receiving cavities on the second gear.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with e accompanying drawings, wherein:

FIG. 5a is a perspective view, from top, front, inside and other angles, of the first alternative implementation of the first back arm.

FIG. 6a is a perspective view, from top, back, front and other angles, of the first alternative implementation of the first base arm.

FIG. 10 is a second alternative implementation for the first middle arm, namely, with both locking pins protruding on both side surfaces of the first middle arm with the double elastic locking materials.

FIG. 20 is a perspective view of the pivot arm mechanism of a fourth embodiment using a single gear mechanism.

FIG. 21 is a perspective view of the pivot arm mechanism of a fifth embodiment using a double gear mechanism.

Figure 1:
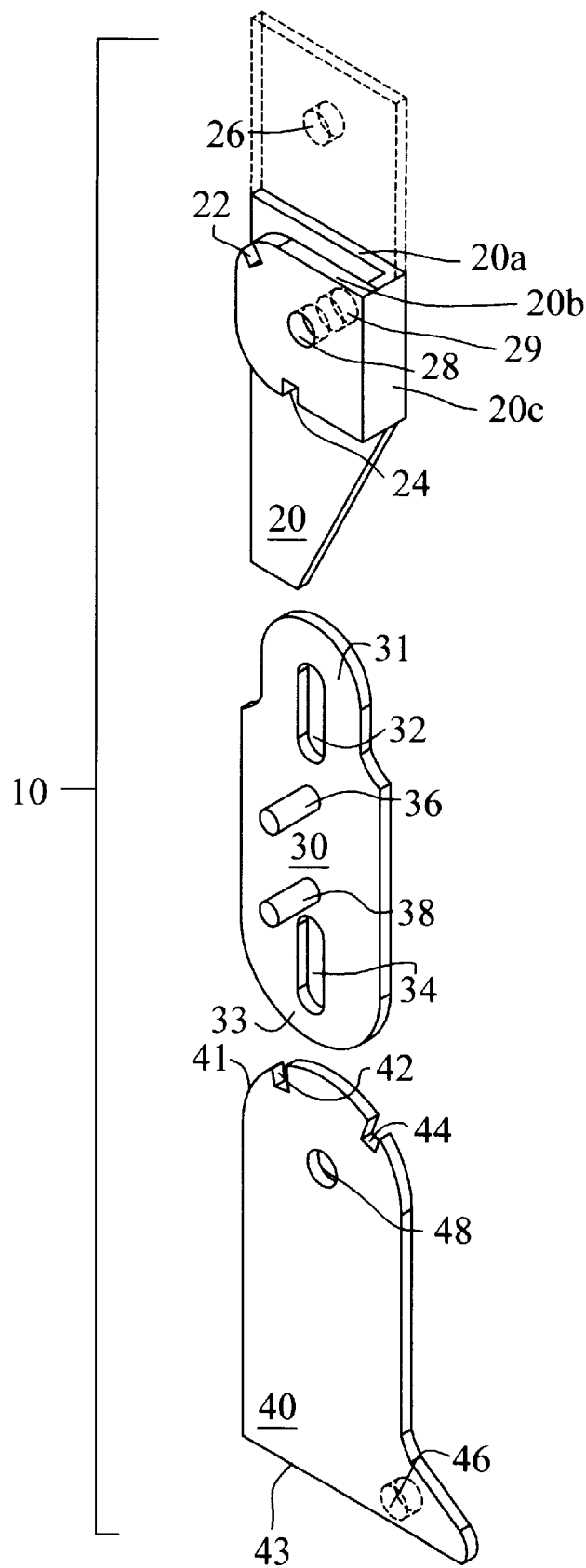
FIG. 1 is a perspective view of a first embodiment of the invention with the lock pin type pivot arm mechanism.
Figure 2:
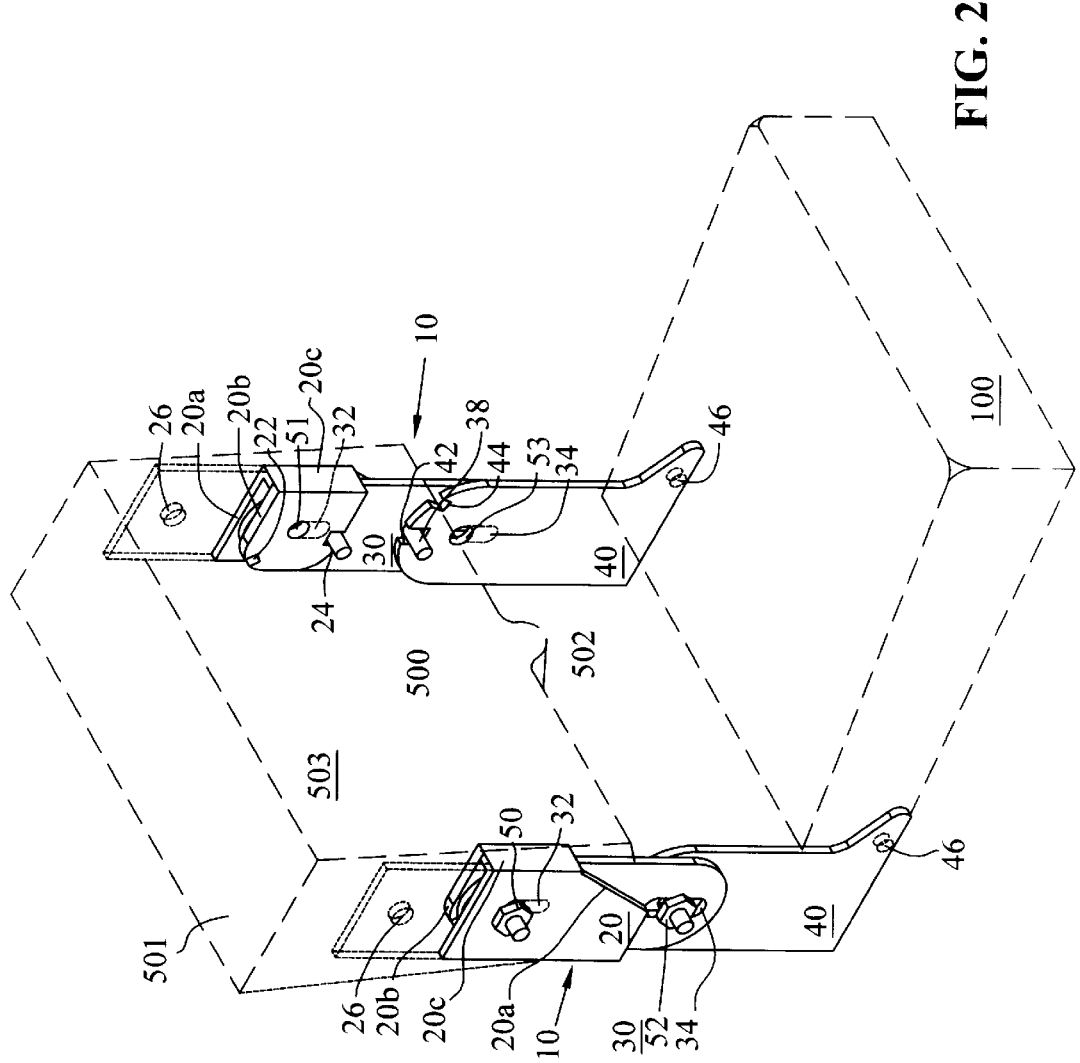
FIG. 2 is a perspective view of the embodiment of FIG. 1 with the seat back in a vertical position for a fully seated position.
Figure 3:
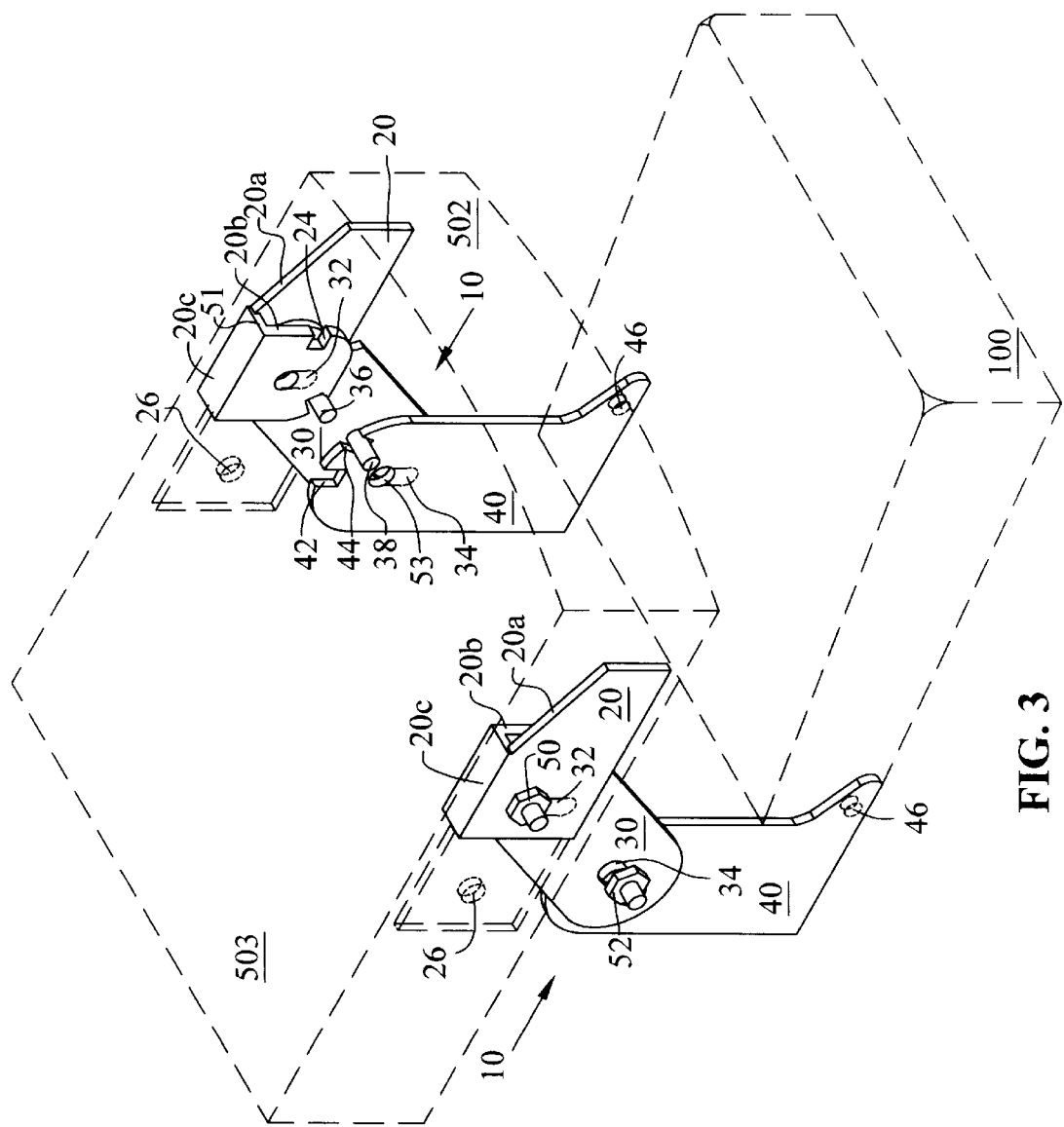
FIG. 3 is a perspective view of the embodiment of FIG. 1 with the seat back in a substantially horizontal position and locked into place whereby the user may rest against the top cushion while remaining substantially standing.
Figure 4:
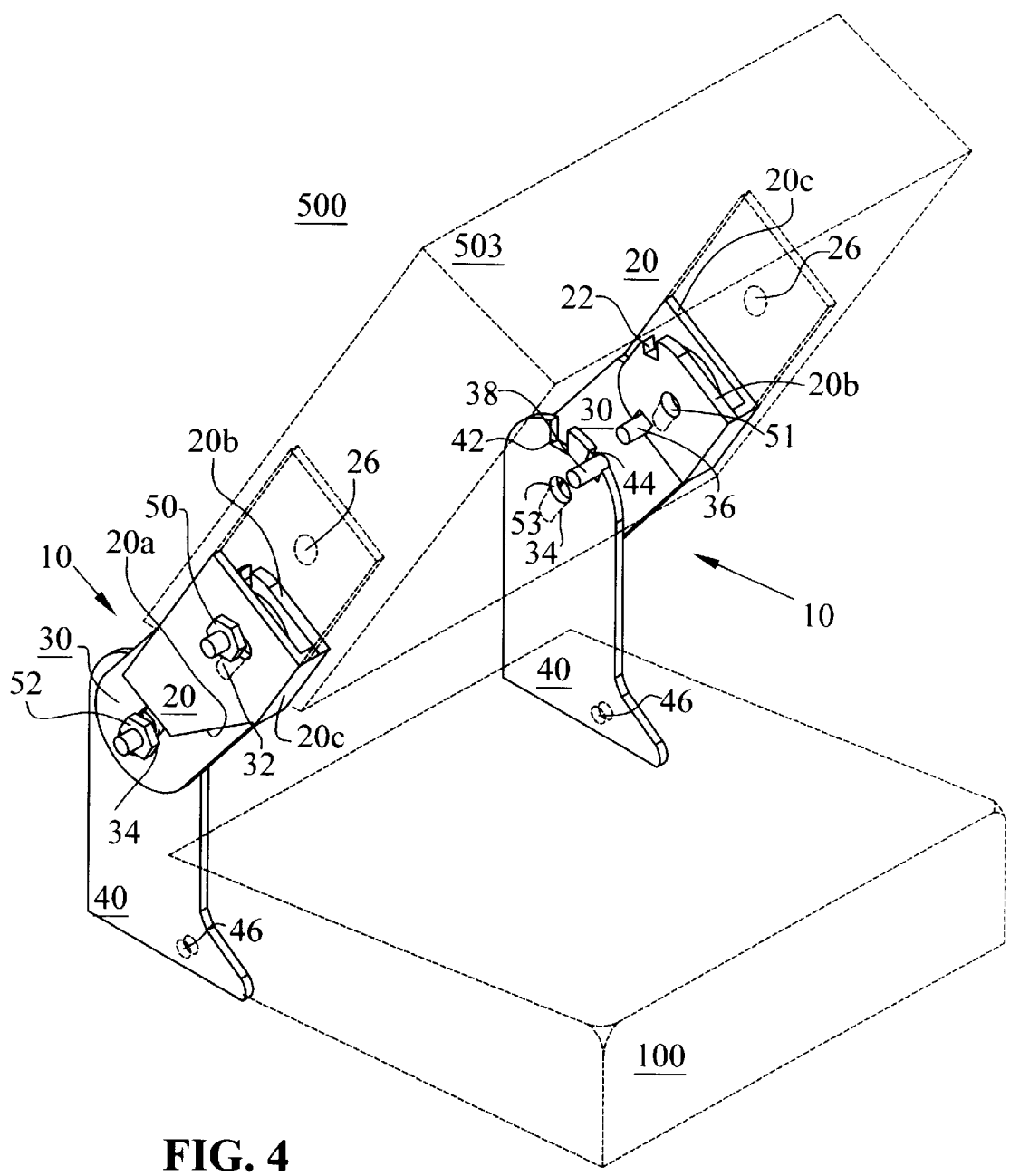
FIG. 4 is a perspective view of the embodiment of FIG. 1 with the seat back being fully folded towards the seat base whereby the seat may be conveniently transported and stored.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, in several forms, and such exemplifications are not to be construed as limiting the scope of the invention in any manner.

DESCRIPTION OF THE INVENTION

The embodiments disclosed below are not intended to be exhaustive or limit the invention to the precise forms disclosed in the following detailed description. Rather, the embodiments are chosen and described so that others skilled in the art may utilize their teachings.

Referring to the drawings in greater detail, the seat of the present invention essentially consists of an upper cushion seat back 500 with a front surface 503, an upper edge 501 and a lower edge 502, a lower cushion seat base 100, a pivot arm mechanism 10 for one implementation, 101 for an alternative implementation, 102, 103 and 104 for more alternative implementations. Since seats with a base and a back which can tilt relatively are well known in the prior art, only that which relates directly or indirectly to the invention will be described in what follows. The person skilled in the art in question will draw from the current conventional solutions at his disposal in order to deal with the particular problems with which he is confronted.

In what follows, an equivalent element will be generally designated by an identical reference numeral in each distinct embodiment.

As can be seen with reference to all drawings, a seat with back cushion 500 and base cushion 100 according to the invention is provided with pivot arm mechanism to serve as a tilt-and-lock device. Note that base cushion 100 may be optionally mounted on a boat floor. As result of this device, for example of the type given in all the above mentioned embodiments, it is possible to tilt back cushion 500 relative to seat base cushion 100, without any initial limiting position and in any direction or any order and, in a range larger than 90 degrees between a virtually vertical upright position and other tilted positions which can be altered as desired with the most useful positions being the vertical, horizontal and completely folded.

Except for seat back 500, since seat base 100 is of any appropriate conventional type, it has only been illustrated in outline form for clarity of depiction. Back cushion 500 and base cushion 100 are intended to be carried by pivotable support arms 10 in the first embodiment or 101 in the second embodiment, or 102, 103 and 104 in more alternative embodiments. In all embodiments, pivotable support arm comprises a back arm, intended to fasten to back cushion 500, and base arm, intended to fasten to base cushion 100, and a middle arm, pivotably connected between back arm and base arm, having features which form a tilt-and-lock mechanism.

In one implementation as shown in FIGS. 1 through 4, the pivot arm mechanism uses first back arm 20 having two substantially parallel plates 20a and 20b connected along peripheral edge 20c thereby forming a substantially equal distance space in which first end portion 31 of first middle arm 30 may be inserted. One plate 20a of first back arm 20 is longer than other 20b whereas longer plate 20a provides an extension area for fastening seat back cushion 500, while shorter plate 20b is substantially round shaped having at least two recessed portions, namely first recess 22 and second recess 24 on its round edge. Obviously, the more apart the two end recessed portions 22 and 24 are, the bigger the angular degree will be, therefore, the closer the seat back 500 and seat base 100 may be folded. Same is also true, namely, the more recessed portions, the more adjustable seat positions. There are a first opening 28 and a second opening 29 on both longer and shorter plates 20a and 20b respectively, along the same axis which are located at the geometrical center of shorter plate 20b.

First middle arm 30 comprises a long plate having first end portion 31 and second end portion 33, first slot 32 and second slot 34 on each end portion respectively, and first lock pin 36 and second lock pin 38 respectively next to each slot but on the inner side towards the center of first middle arm 30. Both lock pins 36 and 38 protrude outwardly on the same side surface of first middle arm 30. Through first and second openings 28 and 29 on first back arm 20 and first slot 32 on first middle arm 30, first back arm 20 and first middle arm 30 are engaged by first mounting screw 51 with first nut 50 through which first middle arm 30 may freely rotate and slide along first slot 32. Peripheral connection edge 20c between parallel plates 20a and 20b on first back arm 20 is to provide minimal space constraint whereby first middle arm 30 partially inserted and engaged between parallel plates 20a and 20b on first back arm 20 may pivotably rotate along first mounting screw 51 and slide along first slot 32 to a significant degree. First back arm 20 and first middle arm 30 may be locked into different positions by positioning first lock pin 36 into one of recessed portions 22 or 24 on shorter plate 20a of first back arm 20.

Connected to the other end portion of first middle arm 30 is L-shaped first base arm 40 with top round portion 41 being substantially round shaped with first opening 48 at the geometrical center of top round portion 41 and having at least two recessed portions, namely, first recess 42 and second recess 44 on the edge of top round portion 41. Obviously, the more apart the two end recessed portions 42 and 44 are, the bigger the angular degree will be, therefore, the closer the seat back 500 and seat base 100 may be folded. Same is true that the more recessed portions, the more seat positions. Through second slot 34 on first middle arm 30 and first opening 48 on first base arm 40, first middle arm 30 and first base arm 40 are engaged by second mounting screw 53 with second nut 52 through which first base arm 40 may freely rotate and slide along second slot 34. First middle arm 30 and first base arm 40 may be locked into different positions by positioning second lock pin 38 into one of recessed portions 42 or 44 on the round shaped edge of top round portion 41 of first base arm 40. Base portion 43 of first base arm 40 provides an extension area for fastening seat base cushion 100.

Figure 5:
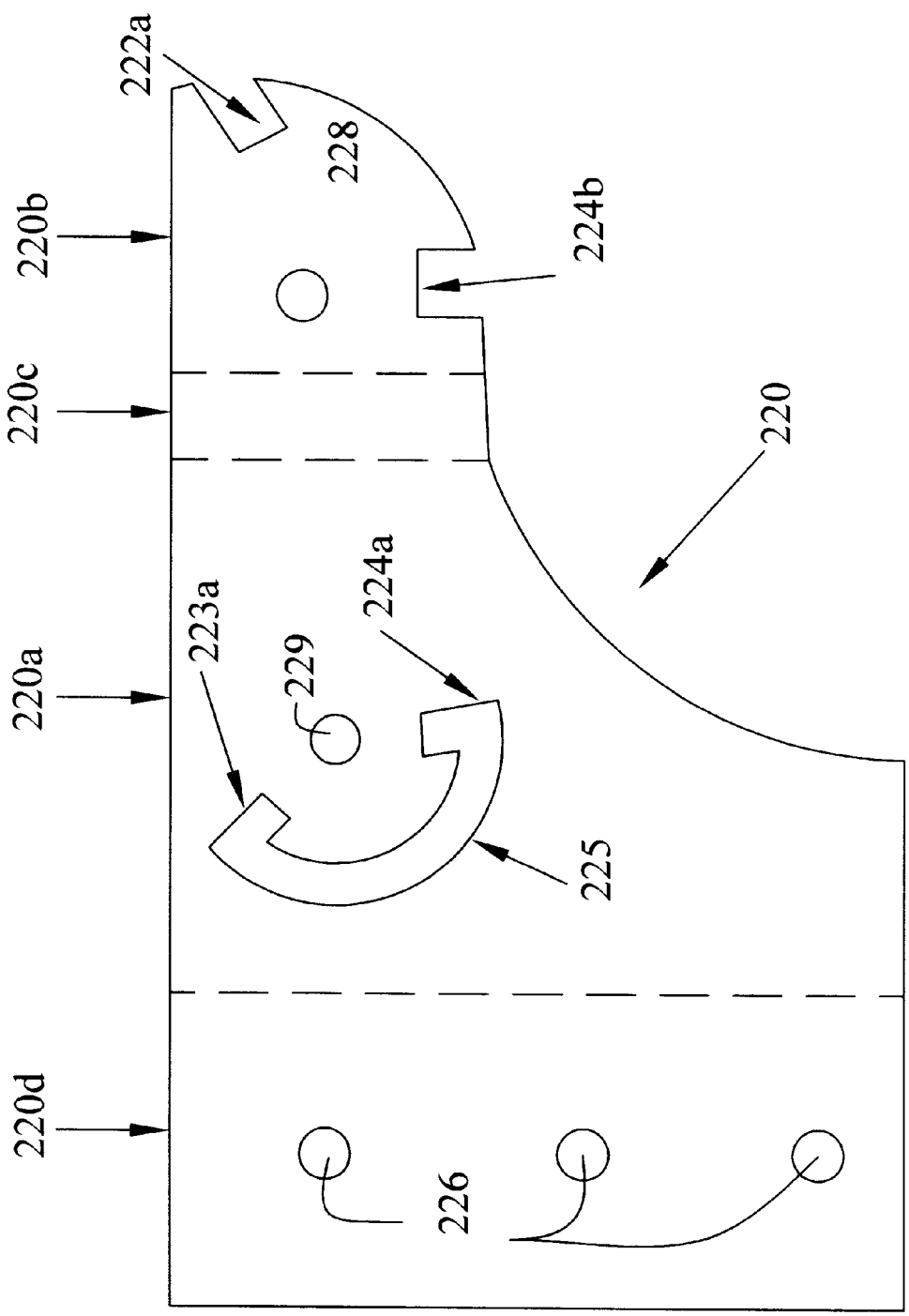
FIG. 5 is a schematic view of the first alternative implementation of the first back arm, namely, the one-piece material implementation.

In a first alternative implementation for the first back arm 20, the first alternative back arm 220 as shown in FIG. 5 and 5a, is formed in a one-piece material consisting of four sections 220A, 220B, 220C and 220D, separated by and bent along three parallel separation lines. First section 220D is rectangularly shaped and has three holes 226 through which the seat back may be attached by mounting screws or rivets. Second section 220A is wedge shaped with two parallel sides and the longer side is connected with first section 220D and the shorter side is connected with a rectangularly shaped third section 220C. The end portion of wedge shaped second section 220A has one hole 229 and a semicircular slot 225 centered geometrically along hole 229. Semicircular slot 225 points towards the wedge tip direction and it has two recessed portions 222A and 224A towards opposite ends and the tip of wedge shaped second section 220A points away from hole 229 and semicircular slot 225. The fourth section 220B is sectorially shaped and has a hole 228 at the geometrical center of its semicircular side and the semicircular side has two recessed portions 222A and 224B. One straight side of sectorially shaped fourth section 220B is connected with third section 220C and the semicircular side points generally the same direction of the wedge tip on second section 220A. The hole 228, semicircular side, two recessed portions 222B and 224B on fourth section 220B correspond to and are paired with hole 229, semicircular slot 225 and two recessed portions 222A and 224A on wedged shaped second section 220A when second section 220A and fourth section 220B are folded each 90 degrees towards each other along third section 220C, therefore, forming a substantially equal distance space in which a first end portion 31 of the first middle arm 30 may be inserted. First section 220D bends 90 degrees against second section 220A thus providing an extended area for fastening seat back 500. FIG. 5a is a perspective view showing the first alternative first back arm from different angles.

Figure 6:
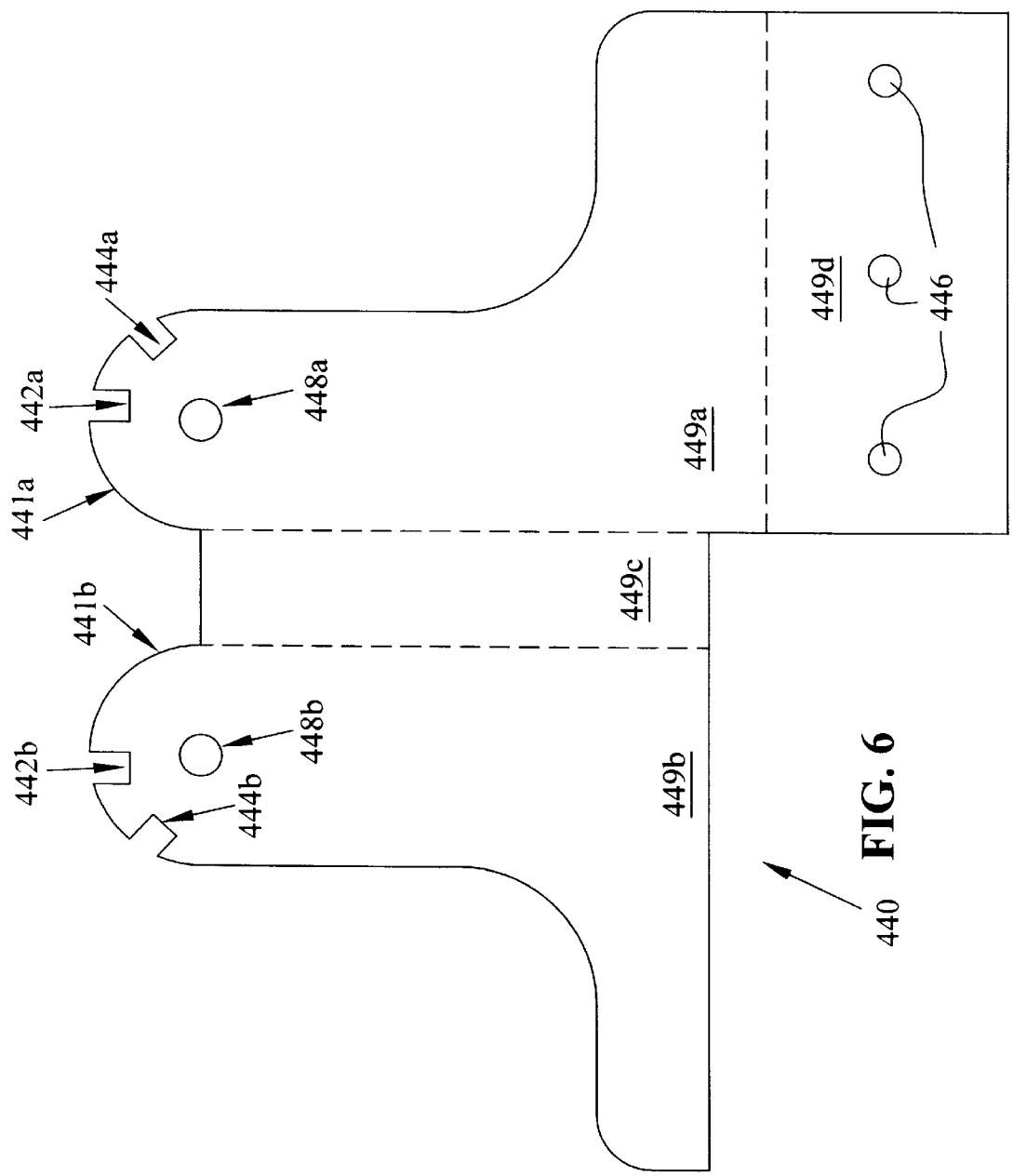
FIG. 6 is a schematic view of the first alternative implementation of the first base arm, namely, the one-piece material implementation.

In a first alternative implementation for the first base arm 40, the first alternative base arm 400 as shown in FIGS. 6 and 6a, is formed in a one-piece material consisting of four sections 440A, 440B, 440C and 440D, separated by and bent along three separation lines, two of the separation lines are parallel and perpendicular to the third separation line. First section 449D is rectangularly shaped and has three holes 446 through which seat base 100 may be attached by mounting screws or rivets. Second section 449A and fourth section 449B are identically L-shaped having a base side, a back side and an L-curve side. Second sections 449A and fourth section 449B are connected asymmetrically on their back sides by a rectangularly shaped third section 449C. The base side of L-shaped second section 449A is connected to first section 449D. L-shaped second section 449A and fourth section 449B have identical round top edges with a hole 448B and 448B respectively, at the geometrical centers of their round edges. Both the top edges on second section 449A and fourth section 449B have two recessed portions 442A and 444A and 442B and 444B respectively. Obviously, the more apart the end recessed portions 442A and 444A on second section and 442B and 444B and fourth section are, the bigger the angular degree will be, therefore, the closer the seat back 500 and seat base 100 may be folded. The holes 448A and 448B and two paired recessed portions 442A and 444A on second section 449A and 442B and 444B on fourth section 448B correspond to and are paired with each other when second and fourth sections 449A and 449B are folded each 90 degrees towards each other along third section 449C, thus forming a substantially equal distance space in which a second end portion 33 of said first middle arm 30 may be inserted, first section 449D bends 90 degrees against second section 449A whereby providing an extended area for fastening seat base 100.

Figure 7B:
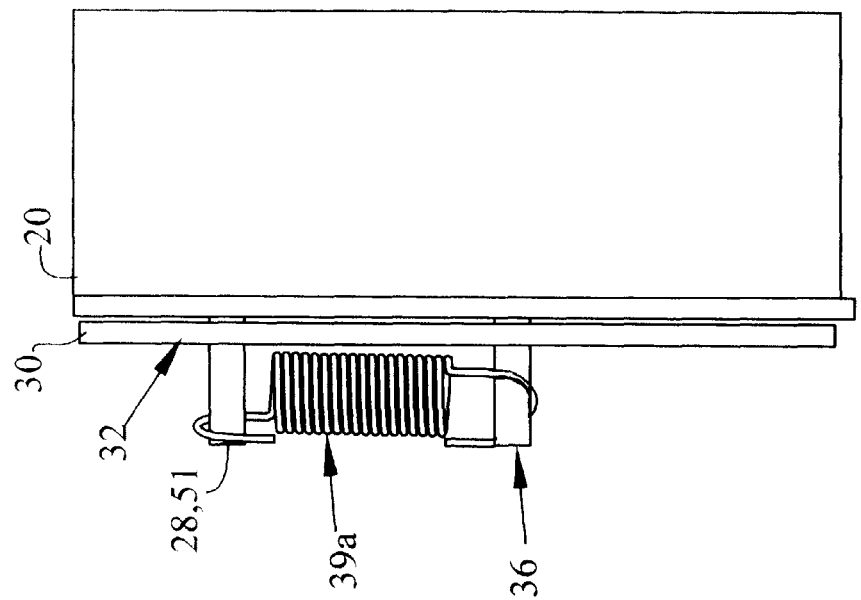
FIG. 7 is a perspective view of the first alternative implementation for the lock pin type pivot arm mechanism, namely, with the double locking coil springs.
Figure 7A:
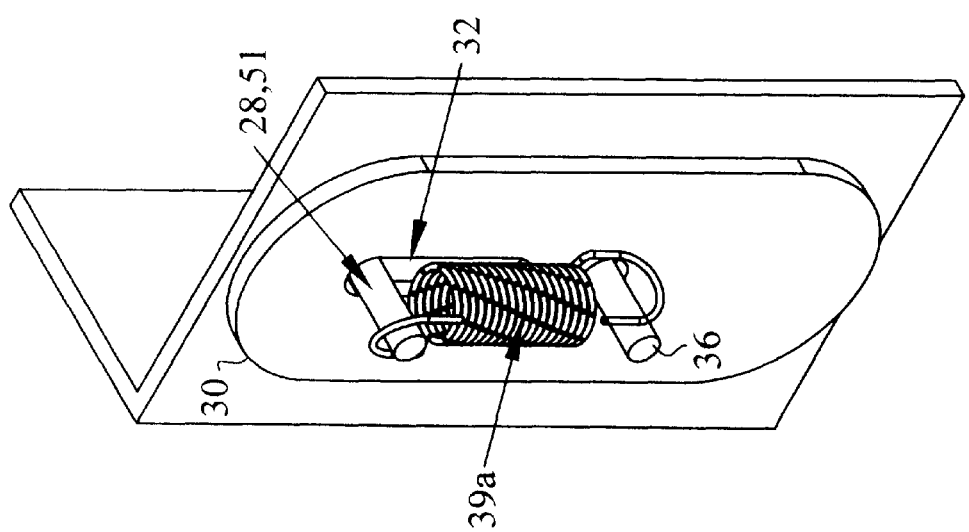

In a first alternative implementation for the lock pin type pivot arm mechanism as shown in FIG. 7, a first and second locking coil springs 39A and 39B (not shown) are attached between the first mounting screw or rivet and first lock pin 36 and between the second mounting screw or rivet and second lock pin 38 (not shown), thus holding the lock pins 36 and 38 in place.

Figure 8:
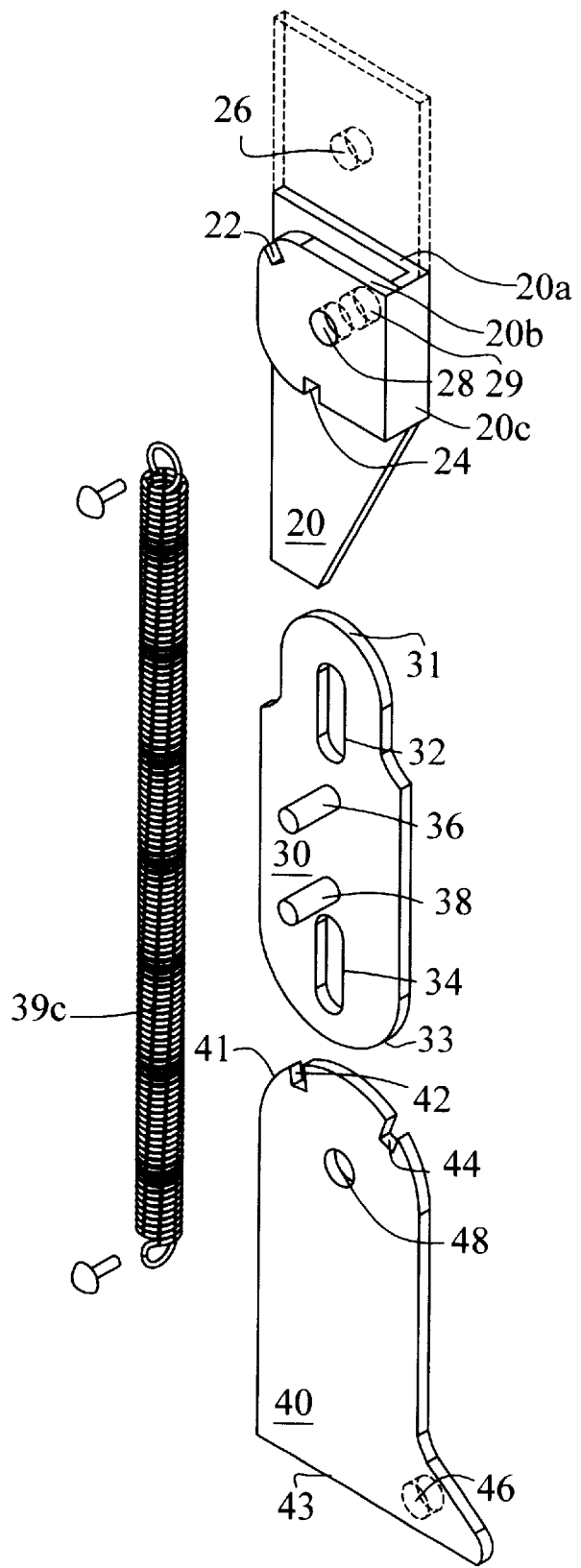
FIG. 8 is a perspective view of the second alternative implementation of the lock pin type pivot arm mechanism, namely, with a single locking coil spring.

In a second alternative implementation for the lock pin type pivot arm mechanism as shown in FIG. 8, a single locking coil spring 39C is attached between the first mounting screw or rivet and the second mounting screw or rivet, thus holding the lock pins 36 and 38 in place.

Figure 9A:
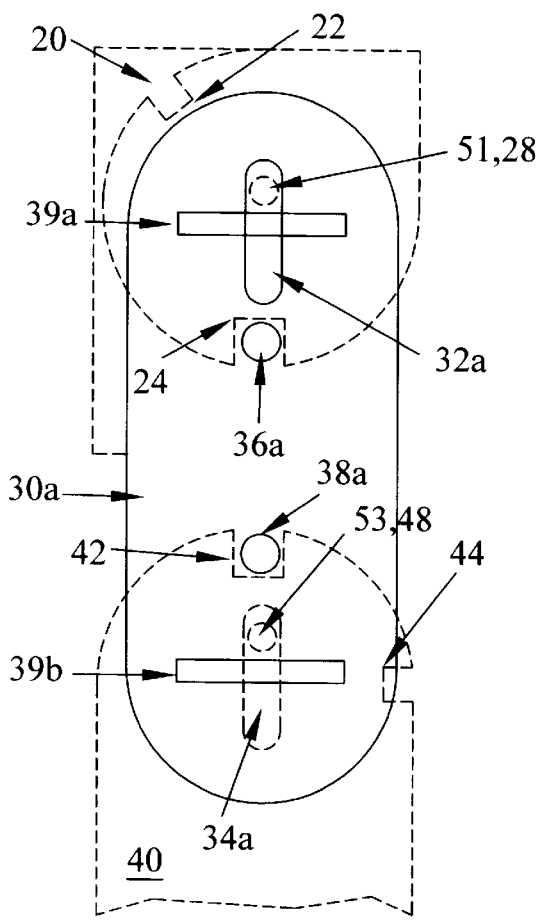
FIG. 9 is a perspective view of the first alternative implementation of the first middle arm, namely, with double elastic locking materials affixed across the sliding slot to keep lock pins in place.
Figure 9B:
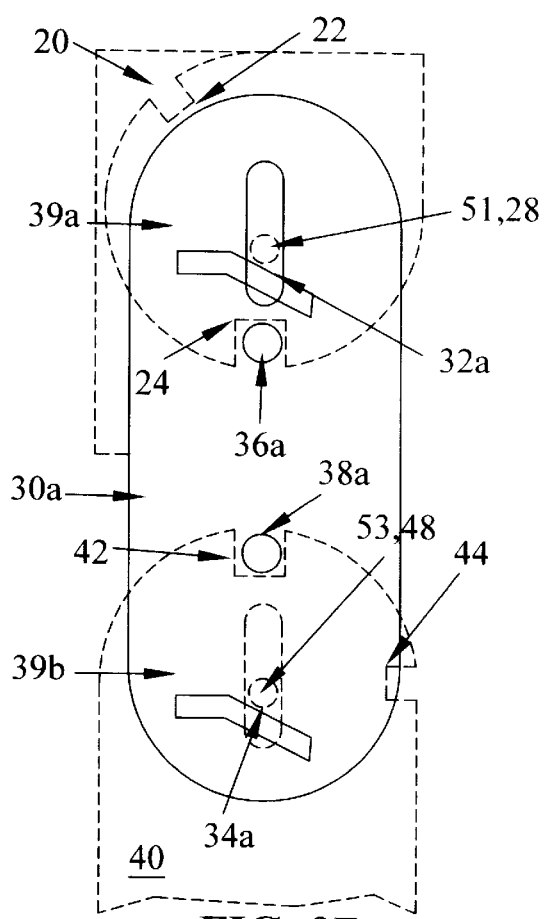
Figure 11:
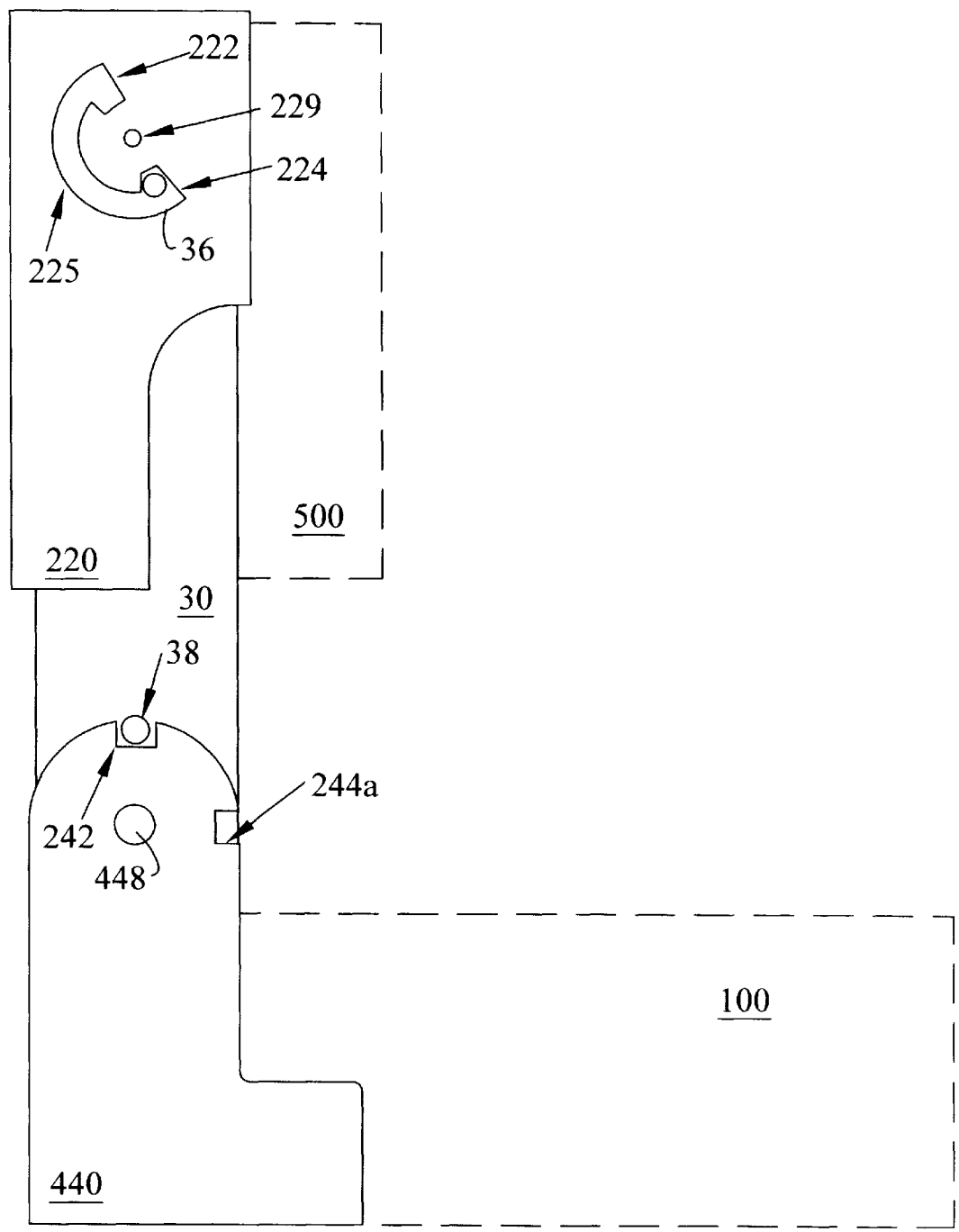
FIG. 11 is an inside view of the lock pin type pivot arm mechanism with the first alternative implementations for both first back and first base arms when the seat back is in a vertical position.
Figure 12:
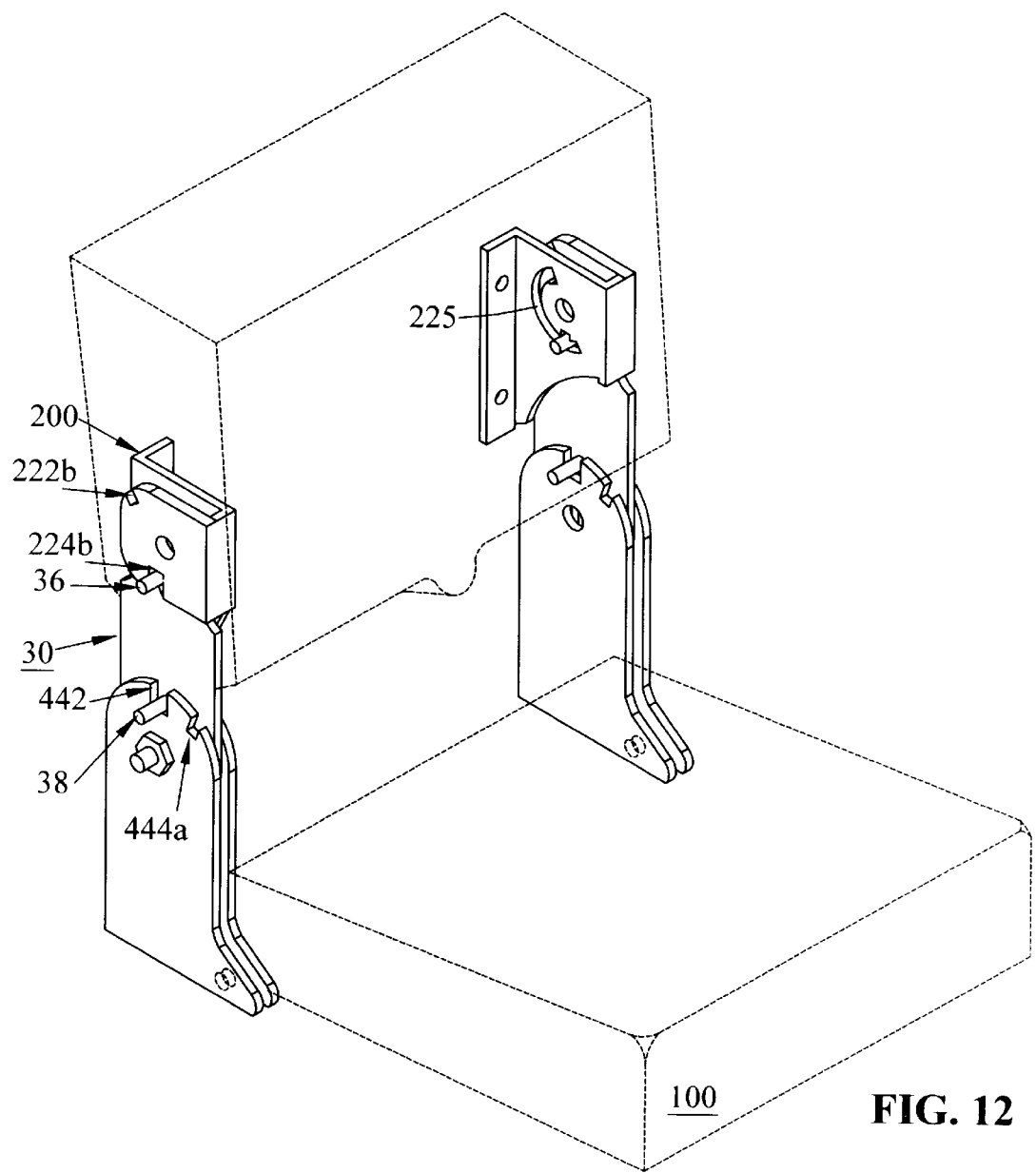
FIG. 12 is an angled view of the lock pin type pivot arm mechanism with the first alternative implementations for both first back and first base arms when the seat back is in a vertical position.
Figure 13:
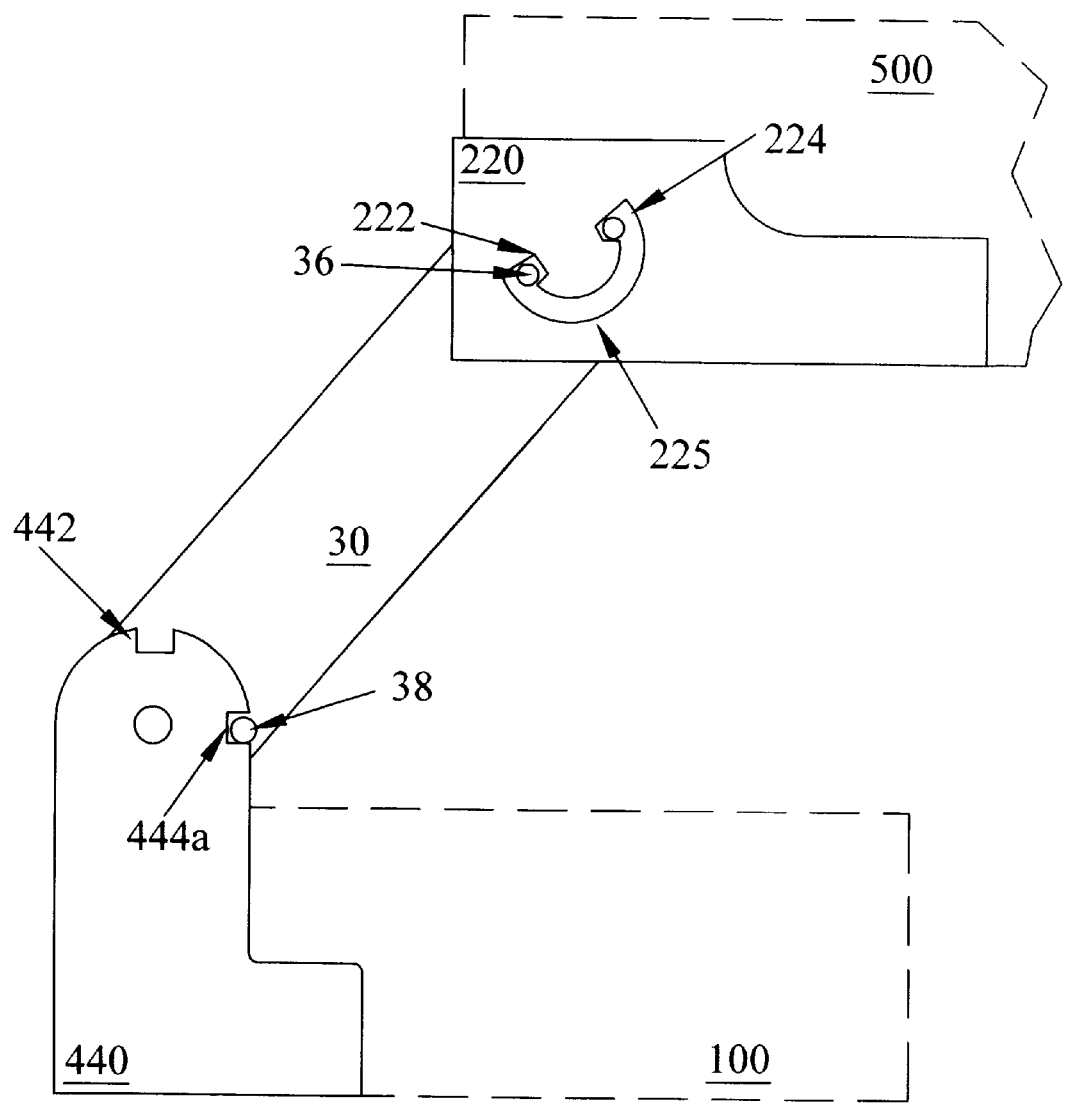
FIG. 13 is an angled view of the lock pin type pivot arm mechanism with the first alternative implementations for both first back and first base arms when the seat back is in a substantially horizontal position.
Figure 14:
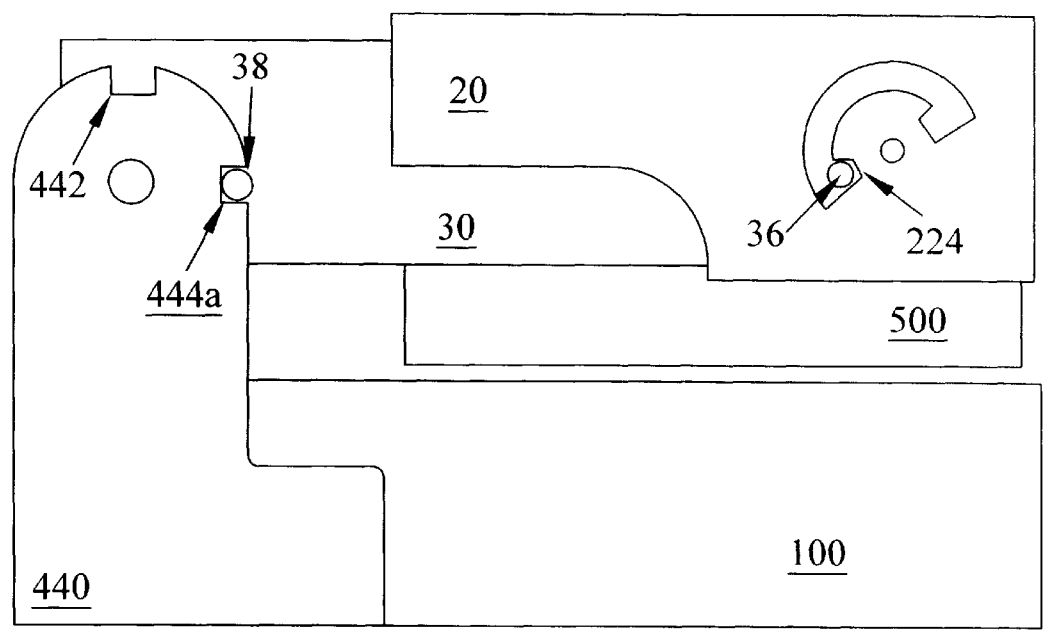
FIG. 14 is an angled view of the lock pin type pivot arm mechanism with the first alternative implementations for both first back and first base arms when the seat back is in a substantially folded position.
Figure 15:
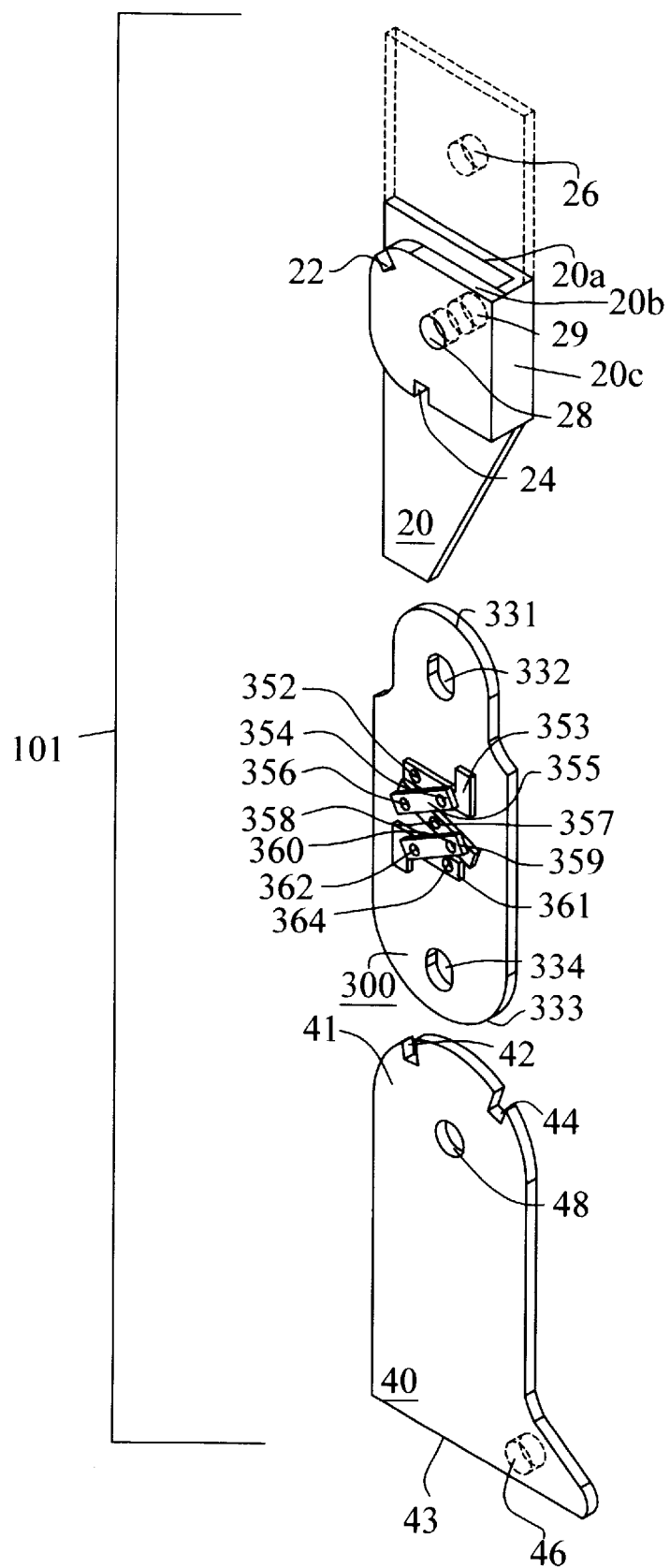
FIG. 15 is a perspective view of the latch type pivot arm mechanism.
Figure 16:
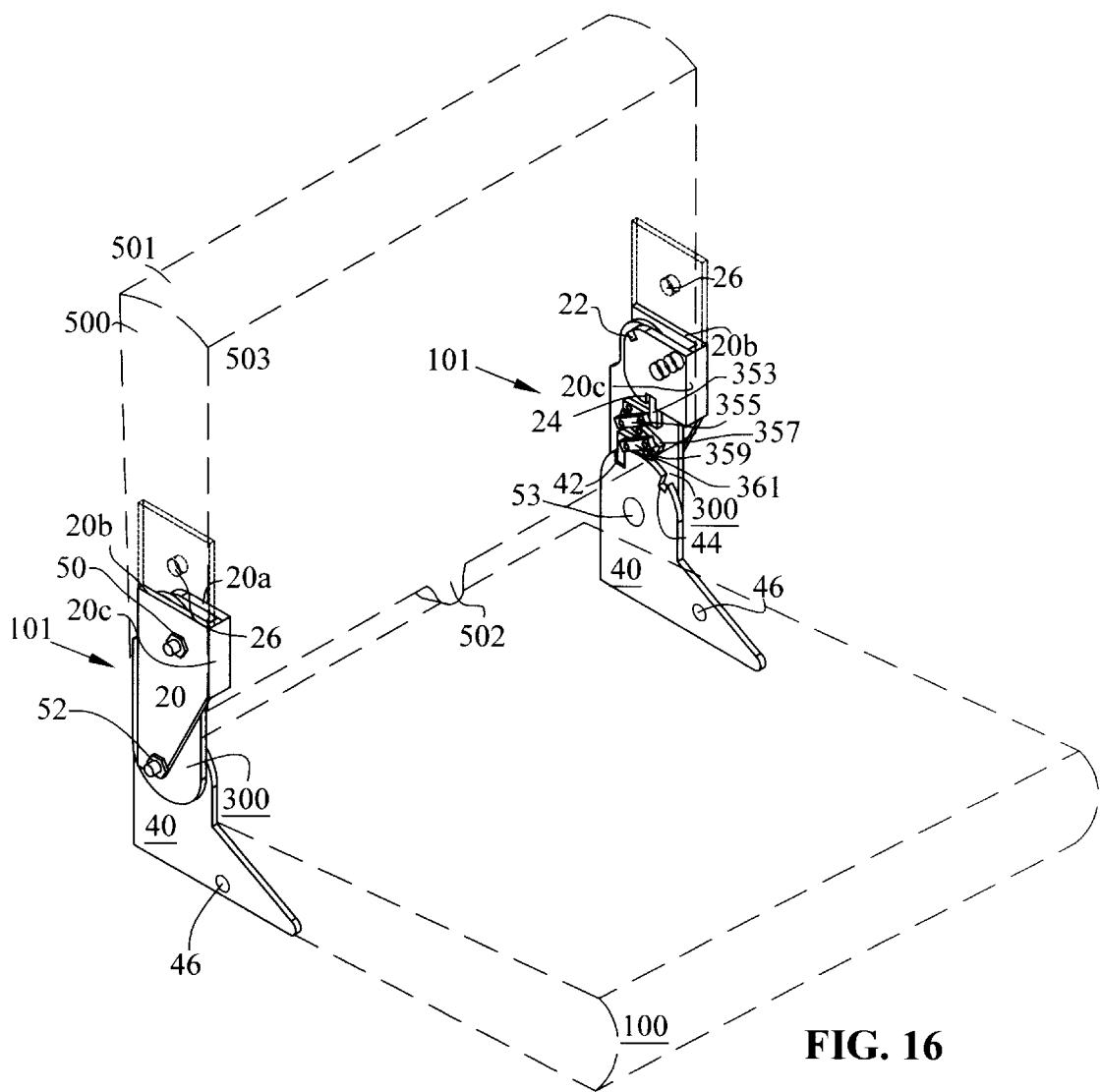
FIG. 16 is a perspective view of the embodiment of FIG. 15 with the seat back in a vertical position for a fully seated position.
Figure 17:
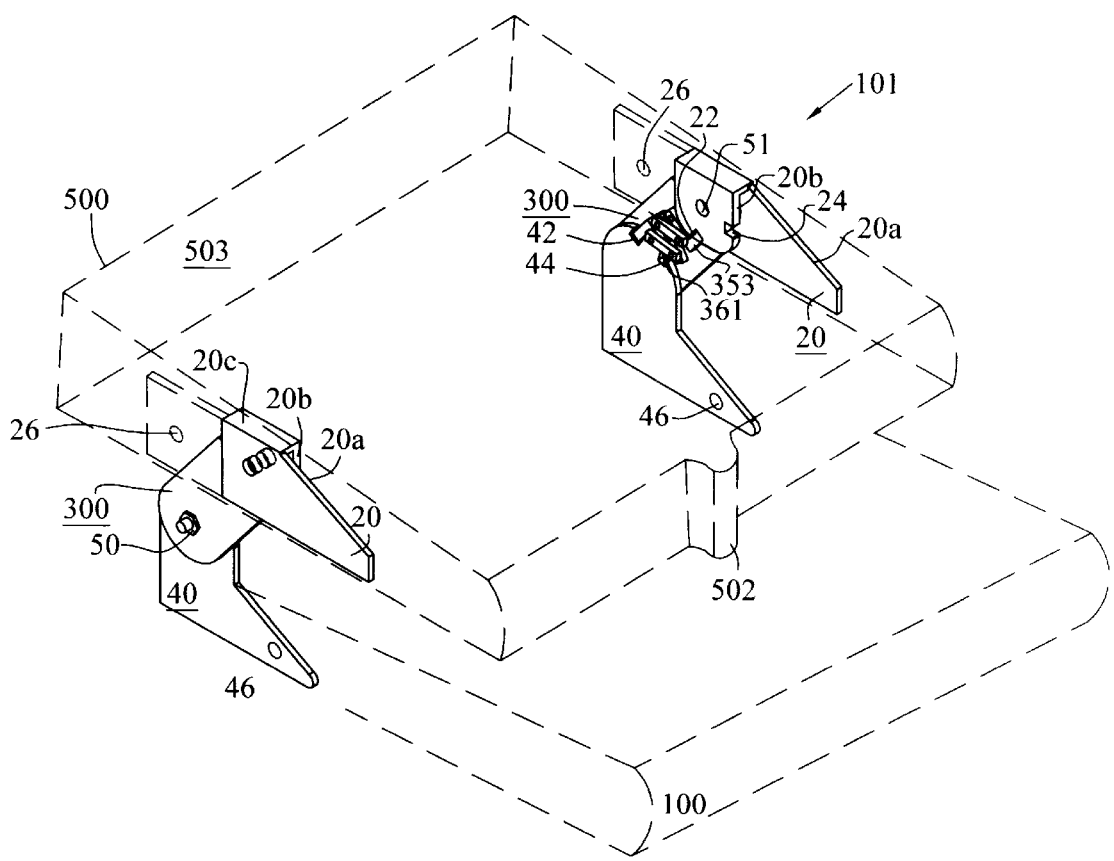
FIG. 17 is a perspective view of the embodiment of FIG. 15 with the seat back in a substantially horizontal position and locked into place whereby the user may rest against the top cushion while remaining substantially standing.
Figure 18:
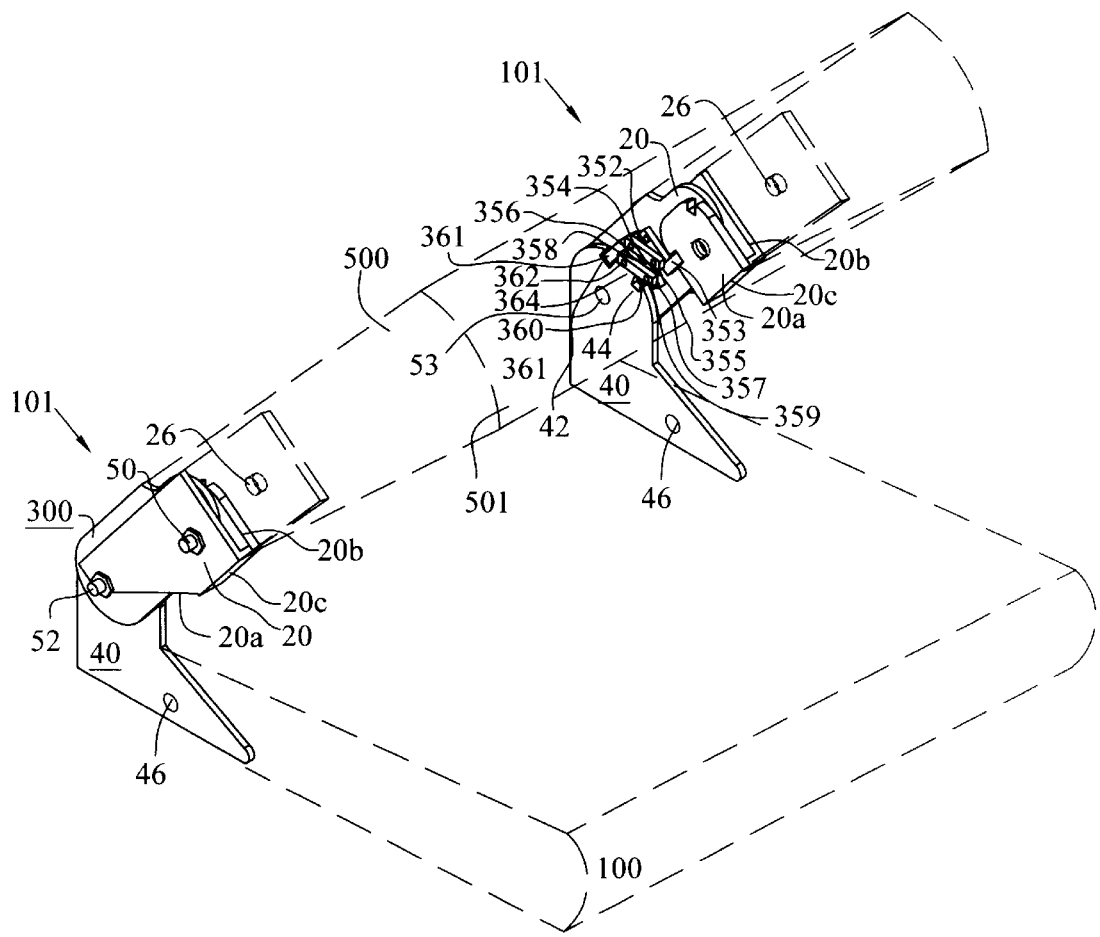
FIG. 18 is a perspective view of the embodiment of FIG. 15 with the seat back being fully folded towards the seat base whereby the seat may be conveniently transported and stored.

In a first alternative implementation for the first middle arm 30, the first alternative middle arm 30A as shown in FIG. 9, is identical to the first middle arm 30 except that there are two pieces of elastic locking materials 39A and 39B affixed onto first middle arm 30A across each sliding slot 32A and 34A respectively, thus keeping mounting screws or rivet from sliding inside the slots 32A and 34A whereby holding lock pins 36A and 38A in place.

In yet anther alternative implementation for the first middle arm 30, the first alternative middle arm 30B as shown in FIG. 10, is identical to the above mentioned first middle arm 30 except that both the lock pins 36B and 38B are protruding on both side surfaces of the first middle arm 30B.

FIG. 11 through 14 are perspective views for the combined first alternative implementations of both first back and first base arms 200 and 400.

In another implementation as shown in FIGS. 15–18, the pivot arm mechanism uses the same first back arm and first base arm. The first back arm has two substantially parallel plates 20a and 20b connected along small peripheral edge 20c thereby forming a substantially equal distance space in which first end portion 331 of second middle arm 300 may be inserted. Second middle arm 300 has a thickness substantially equal to the space distance between plates 20a and 20b of first back arm 20.

Second middle arm 300 comprises a long plate having first end portion 331 and second end portion 333, first opening 332 and second 334 on each end portion respectively. Through first and second openings 28 and 29 on first back arm 20 and first opening 332 on second middle arm 300, first back arm 20 and second middle arm 300 are engaged by first mounting screw 51 with first nut 50 through which second middle arm 300 may freely rotate. Peripheral connection 20c between parallel plates 20a and 20b on first back arm 20 provides a minimal space constraint such that second middle arm 300 partially inserted and engaged between parallel plates 20a and 20b on first back arm 20 may pivotably rotate along first mounting screw 51 to a significant degree possible.

Connected to the other end portion of second middle arm 300 is the L-shaped first base arm 40. Through second opening 334 on second middle arm 300 and first opening 48 on first base arm 40, second middle arm 300 and first base arm 40 are engaged by second mounting screw 53 with second nut 52 through which first base arm 40 may freely rotate.

On one side surface of second middle arm 300, first L-shaped latch 353 is mounted at its first end by third mounting screw 352 onto second middle arm 300 near first opening 332 of second middle arm 300 such that first L-shaped latch 353 may pivotably rotate along third mounting screw 352 and be able to latch upwardly into one of recesses 22 or 24 on the round edge of first back arm 20. Rotating lever 357 is mounted by fourth mounting screw 358 onto generally the center position of second middle arm 300 such that rotating lever 357 may pivotably rotate along fourth mounting screw 358. On the same side surface of second middle arm 300 onto which first latch 353 is mounted, second L-shaped latch 361 is mounted at its first end by fifth mounting screw 364 onto second middle arm 300 near second opening 334 of second middle arm 300 such that second L-shaped latch 361 may pivotably rotate along fifth mounting screw 364 and be able to latch downwardly into one of recesses 42 or 44 on the round edge of first base arm 40. First upper coupling bracket 355 is connected between a first end portion of rotating lever 357 and near the notch position of first latch 353 by first bolt 356 and second bolt 354, respectively. Similarly, first lower coupling bracket 359 is connected between a second end portion of rotating lever 357 and near the notch position of second latch 361 by third bolt 360 and fourth bolt 362, respectively. First and second latches 353 and 361, rotating lever 357 and first upper and first lower coupling brackets 355 and 359 form a latch rotate-and-lock mechanism whereby first and second latches 353 and 361 may lock or release, upwardly and downwardly, into or out of recesses 22 or 24 and 42 or 44 on first back arm 20 and first base arm 40 respectively, when a clock wise or counter clock wise force is applied pivotably, depending upon the initial position when the rotating lever was connected to the coupling brackets.

Figure 19:
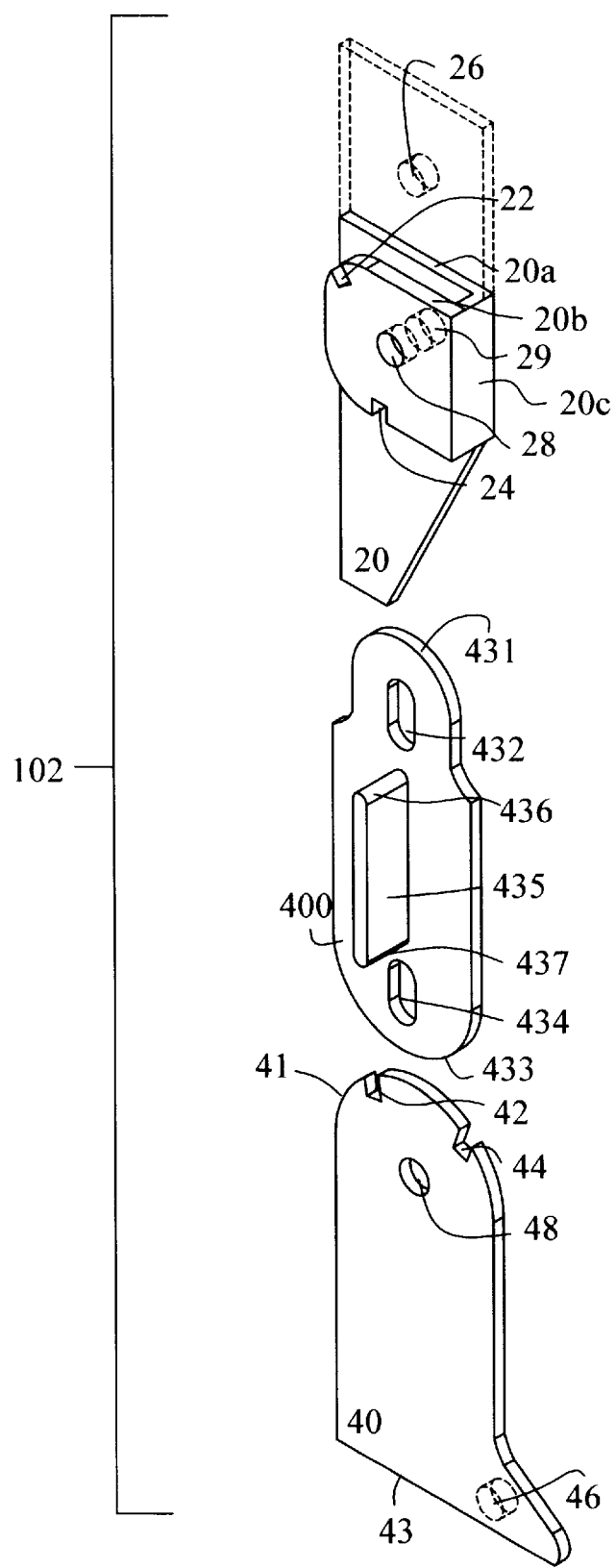
FIG. 19 is a perspective view of the pivot arm mechanism of a third embodiment using a single lock bar mechanism.

In yet another implementation as shown in FIG. 19, the seat uses the same first back arm 20 and first base arm 40 but uses a different middle arm, namely, the third middle arm 400. In this alternative embodiment, third middle arm 400 is a long plate having a first slot 432 and a second slot 434 near each end portion 431 and 433 respectively and, having one straight lock bar 435 along the axis connecting slots 432 and 434, with a first lock end 436 and a second lock end 437, placed on generally the center position of third middle arm 400 extending next to and in between slot 432 and 434 respectively. Through first and second openings 28 and 29 on first back arm, and first slot 432 on third middle arm, first back arm 20 and third middle arm 400 are engaged by a first mounting screw 50 and first nut 51 through which third middle arm 400 may freely rotate and slide along first slot 432. Similarly, through second slot 434 on third middle arm 400 and first opening 48 on first base arm 40, third middle arm 400 and first base arm 20 are engaged by a second mounting screw 52 with a second nut 53 through which first base arm 40 may freely rotate and slide along second slot 434. This single lock bar type pivot arm mechanism allows first back arm 20 and first base arm 40 be tilted, without any initial limiting position and in virtually any direction and in any order, and be locked into any position where the recesses are located, namely, recesses 22 or 24 on first back arm 20 and 42 or 44 on first base arm 40, by moving single lock bar 435 into corresponding recessed portions on first back arm 20 and first base arm 40 respectively.

In yet another implementation as shown in FIG. 20, a second back arm 600 and a second base arm 800 are essentially the same as those used in the above mentioned implementations, except that in this implementation, second back arm 600 and second base arm 800 have multiple recessed portions 622 and 842 respectively, to receive a gear mechanism. In this implementation, a fourth middle arm 700 is a long plate having a first and a second opening 732 and 734 near each end portion 731 and 733 respectively and, having a first round gear 740 placed on generally the center position of fourth middle arm 700. First gear 740 has a handle bar 737 perpendicularly connected at center position of first gear 740 for ease of operation. First gear 740 is connected to fourth middle arm 700 through an extendable pin mechanism 739 such that first gear 740 may be pulled or pushed perpendicularly, outwardly or inwardly to disengage or engage the single gear lock mechanism respectively. There are multiple receiving cavities 735 on first gear 740 surrounding its center along an equal radius line to receive a third lock pin 736 which is connected to fourth middle arm 700 along the same radius line and on the same side surface where first gear 740 is placed. Through first and second openings 628 and 629 on second back arm 600 and first opening 732 on fourth middle arm 700, second back arm 600 and fourth middle arm 700 are engaged by a first mounting screw 50 and a second nut 51 through which fourth middle arm 700 may freely rotate. Similarly, through a second opening 734 on fourth middle arm 700 and first opening 848 on second base arm 800, fourth middle arm 700 and second base arm 800 are engaged by a second mounting screw 52 with a second nut 53 through which second base arm 800 may freely rotate. When first gear 740 is pulled out and disengaged, this single gear lock mechanism allows second back arm 600 and second base arm 800 be tilted without any initial limiting position and in virtually any direction and in any order and, be locked into any position where the recesses, namely 622, 738 and 842, are located by engaging first gear 740 inwardly and placing third lock pin 736 into one of the receiving cavities 735 on first gear 740.

In yet another implementation as shown in FIG. 21, a third back arm 1000 and a third base arm 1100 are the same as those used in the above mentioned single gear implementation except that the spacing of the multiple recesses may be different due to different gear diameters. In this implementation, a fifth middle arm 900 is a long plate having a first and second opening 932 and 934 near each end portion 931 and 933 respectively and, having a second round gear 950 and third round gear 960 engaged with each other and placed on fifth middle arm 900 such that second and third gears 950 and 960 may engage with multiple recesses 1022 and 1142 on third back and third base arms respectively. Through first and second openings 1028 and 1029 on third back arm 1000 and first opening 932 on fifth middle arm 900, third back arm 1000 and fifth middle arm 900 are engaged by a first mounting screw 50 with a first nut 51 through which fifth middle arm 900 may freely rotate. Similarly, through second opening 934 on fifth middle arm 900 and first opening 1148 on third base arm, fifth middle arm 900 and third base arm 1100 are engaged by a second mounting screw 52 with a second nut 53 through which third base arm 1100 may freely rotate. Second gear 950 has a handle bar 937 perpendicularly connected at the center position of second gear 950 for ease of operation. Second gear 950 is connected to fifth middle arm 900 through an extendable pin mechanism 939 such that second gear 950 may be pulled or pushed perpendicularly, outwardly or inwardly to disengage or engage the double gear lock mechanism respectively. Third gear 960 is connected at its center by a sixth screw 945 with a sixth nut 946 to fifth middle arm 900. There are multiple receiving cavities 935 on second gear surrounding its center along an equal radius line to receive a fourth lock pin 936 which is connected to fifth middle arm 900 along the same radius line and on the same side surface where second gear 950 is placed. When second gear 950 is pulled out and disengaged, this double gear pivot arm mechanism allows third back arm 1000 and third base arm 1100 be tilted without any initial limiting position and in virtually any direction and in any order and, be locked into any position where the recesses, namely 1022, 938, 950 and 1142, are located by engaging second gear 950 inwardly and placing fourth lock pin 936 into one of the receiving cavities on second gear 950.

The boat seat may be easily operated by a user. In the lock pin type implementation, a user needs only to apply a pulling force on first seat back 500 away from first seat base 100 to disengage or engage lock pins 36 and 38 on first middle arm 30 from recesses 22 or 24 on first back arm and 41 or 44 on first base arm respectively, so that a tilting and locking of first seat back 500 or first seat base 100 may be achieved. The same applies to the alternative implementations for first back arm 20 and first base arms 30. In the latch type implementation, a user needs only to apply a pivotal force clock wise or counter clock wise, depending upon the initial position when rotating lever 357 was connected with coupling brackets 355 and 359, to disengage or engage latches 353 and 361 from the above mentioned recesses whereby a tilting and locking of first seat back or first seat base is achieved. Optionally, a handle may be attached to rotating lever 357 to ease the operation. The operation of the single lock bar type implementation is identical to the lock pin mechanism. In the single gear implementation, a user needs only to disengage first gear 740 by pulling handle bar 737 outwardly and then rotate either seat back 500 or seat base 100 to a desired position and, engage first gear 740 with recesses 622 on second back arm 600 and recesses 842 on second base arm 800 by placing handle bar 737 inwardly such that third lock pin 736 locks into one of the receiving cavities 735. Similarly, in the double gear mechanism, a user needs to disengage second gear 950 by pulling handle bar 937 outwardly and then rotate either seat back 1000 or seat base 1100 to a desired position and, engage second gear 950 with third gear 960 and recesses 1022 on third back arm 1000 and recesses 1142 on third base arm 1100 by placing handle bar 937 inwardly such that fourth lock pin 936 locks into one of the corresponding receiving cavities 935.

Although the embodiments described according to the invention have utilized, for pivoting or rotation purposes, screws, bolts, pins, rivets or gears, it is clear that any other solutions, such as ratchets, for example, are also suitable.

The advantage of the boat seat according to the invention can therefore be seen, which not only enables the seat back be in a semi folded position, a substantially vertical position or substantially horizontal position whereby providing different uses for a user, the seat can also be arranged to be completely folded down by rotating the upper and lower cushions towards each other whereby the seat can be conveniently transported and stored.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A boat seat adapted to be mounted in a boat, said boat seat comprising:
    a seat back;
    a seat base;
    a mount attached to one of said seat back and said seat base, said mount adapted to be connected to a boat; and
    a pivot connecting said seat back and said seat base, said pivot including a locking mechanism and arranged to allow said seat back and seat base to be pivotably movable relative to each other to a plurality of positions including three lockable positions, a first lockable position where said seat back is generally vertical to be able to serve as a back support for a fully seated person, a second lockable position where said seat back is generally horizontal, and a third lockable position that causes said seat back and seat base to abut for convenient transport and storage of said boat seat.

2. The boat seat according to claim 1, wherein said seat back has a front surface, an upper edge, and a lower edge having a protruding portion whereby a user may use said protruding portion on said lower edge to enhance standing stability when said seat back is in the generally horizontal position.

3. The boat seat according to claim 2, wherein said protruding portion on said lower edge of said seat back has a substantially bell-curved shape.

4. The boat seat according to claim 1, wherein said plurality of positions has a maximum tilting amplitude larger than 90 degrees.

5. The boat seat according to claim 1, wherein said pivot comprises:
    a first back arm;
    a first base arm; and
    a middle arm connected between said first back arm and said first base arm and structured and arranged so said first back arm and first base arm may, without any initial limiting position and in any direction or order, freely pivotably rotate and slide relative to each other and be locked into said first, second, and third lockable positions.

6. The boat seat according to claim 5, wherein said middle arm being a third middle arm including a plate having a first slot and a second slot proximate a first and a second end portion respectively, and having a single bar locking mechanism, said third middle arm being partially inserted in between a longer plate and a shorter plate on said first back arm, through first and second openings on said first back arm, and said first slot on third middle arm, said first back arm and said third middle arm being engaged by a first mounting screw and a first nut through which said third middle arm may freely rotate and slide along said first slot, and through said second slot on said third middle arm and said first opening on said first base arm, said third middle arm and said first base arm are engaged by a second mounting screw with a second nut through which said first base arm may freely rotate and slide along said second slot whereby allowing said first back arm and first base arm to be tilted, without any initial limiting position and in virtually any direction and in any order, and locked into one of said first, second, and third lockable positions by said single bar locking mechanism.

7. The boat seat according to claim 6, wherein said single bar locking mechanism comprises a lock bar with a first lock end and a second lock end along an axis defined by said first and second slot, said lock bar being placed on a generally center position of said third middle arm and extending adjacent and between said first and second slot, respectively, whereby said first back arm and said first base arm may be locked into any position where said recesses are located on said third back arm and on said first base arm respectively, by placing said single lock bar into said corresponding recessed portions on said first back arm and said first base arm respectively.

8. The boat seat according to claim 5, wherein said first back arm further comprises a one-piece material consisting of four sections separated by and bent along three parallel lines, the first section being generally rectangularly shaped and defining multiple cavities through which said seat back may be attached by mounting screws, the second section being generally wedge shaped with two parallel sides and the longer side connected with said first section and the shorter side connected with a generally rectangularly shaped third section, the end portion of said wedge shaped second section defining one cavity and a semicircular slot centered geometrically along said cavity, said semicircular slot pointing generally towards the tip of wedge shaped second section and having multiple recessed portions, and the tip of the wedge shaped second section pointing away from said cavity and said semicircular slot, and the fourth section being substantially sectorially shaped defining a cavity at the geometrical center of its semicircular side, said semicircular side having multiple recessed portions, one straight side of said sectorially shaped fourth section being connected with said third section and the semicircular side pointing towards generally the same direction of said wedge tip on said second section, and said cavity, semicircular side and multiple recessed portions on said fourth section corresponding to and being paired with said cavity, semicircular slot and multiple recessed portions on said wedged shaped second section when said second and fourth sections are folded each 90 degrees towards each other along said third section whereby forming a substantially equal distance space in which a first end portion of said first middle arm may be inserted, said first section bends 90 degrees against said second section whereby providing an extended area for fastening said seat back.

9. The boat seat according to claim 8, wherein said multiple recessed portions on said first back arm are arranged such that at least two of said multiple recessed portions on said first back arm are able to tilt and lock said seat into one of said first, second, and third lockable positions.

10. The boat seat according to claim 9, wherein said first back arm has two paired recessed portions for receiving a first lock pin on said first middle arm.

11. The boat seat according to claim 5, wherein said first base arm further comprises a one-piece material consisting of four sections separated by and bent along three lines, of which two separation lines being parallel and perpendicular to a third separation line, the first section being generally rectangularly shaped and defining multiple cavities through which said seat base may be attached by mounting screws, the second and fourth sections are identically L-shaped having a base side, a back side and an L-curve side, said second and fourth sections being connected asymmetrically on their back sides by a generally rectangular shaped third section, said base side of said L-shaped second section being connected to said first section, said L-shaped second and fourth sections having round top edges defining a cavity at the geometrical centers of said round edges, said top edges having multiple recessed portions, said cavities and multiple recessed portions on said second and fourth sections corresponding to and being paired with each other when said second and fourth sections are folded each 90 degrees towards each other along said third section whereby forming a substantially equal distance space in which a second end portion of said first middle arm may be inserted, said first section bends 90 degrees against said second section whereby providing an extended area for fastening said seat base.

12. The boat seat according to claim 11, wherein said multiple recessed portions on said first base arm are arranged such that at least two of said multiple recessed portions on said first base arm are able to tilt and lock said seat into one of said first, second and third lockable positions.

13. The boat seat according to claim 12, wherein said top round portions of said first base arm have two paired recessed portions for receiving a second lock pin on said first middle arm.

14. The boat seat according to claim 5, wherein said first back arm comprises two substantially parallel plates connected along a peripheral edge to form a substantially equal distance space, one of said plates of said first back arm being longer than the other of said plates, said longer plate providing an extension area for fastening said seat back, and said shorter plate being substantially round shaped having at least two recessed portions, said first back arm having a first and second opening through said longer and shorter plates respectively along a coextensive axis and being located at a geometrical center of said shorter plate.

15. The boat seat according to claim 14, wherein said recessed portions on said first back arm are arranged such that at least two of said recessed portions on said first back arm are able to tilt and lock said seat into one of said first, second, and third lockable positions.

16. The boat seat according to claim 14, wherein said shorter plate on said first back arm has two recessed portions for receiving a first lock pin on said first middle arm.

17. The boat seat according to claim 5, wherein said first base arm comprises a first top round portion being substantially round shaped and a first base portion with an extension area for fastening said seat base, said first base arm having a first opening at a geometrical center of said first top round portion and having at least two recessed portions on said first top round portion.

18. The boat seat according to claim 17, wherein said top round portion of said first base arm has two recessed portions for receiving a second lock pin on said first middle arm.

19. The boat seat according to claim 17, wherein said middle arm being a second middle arm including a plate having a first and second end portion with a first and a second opening-near said first and second end portions; respectively, and having a latch locking mechanism, said second middle arm being partially inserted in between longer and shorter plates on said first back arm, through said first and second openings on said first back arm and said first opening on said second middle arm, said first back arm and said second middle arm being engaged by a first mounting screw with a first nut, through said first opening on said top round portion of said first base arm and said second opening on said second middle arm, said first base arm and said second middle arm being engaged by a second mounting screw with a second nut, whereby said first back arm and first base arm may, without any initial limiting position and in any direction or order, freely pivotably rotate relative to each other and be locked into one of said first, second, and third lockable positions by said latch locking mechanism.

20. The boat seat according to claim 19, in said latch locking mechanism comprises, on a side surface of said second middle arm, a first L-shaped latch mounted at a first end by a third mounting screw onto said second middle arm near said first opening of said second middle arm such that said first L-shaped latch may pivotably rotate along said third mounting screw and be able to latch upwardly into one of at least two recessed portions on said first back arm, a rotating lever being mounted onto generally the center position of said second middle arm such that said rotating lever may pivotably rotate on the side surface of said second middle arm onto which said first latch is mounted, a second L-shaped latch being mounted at a first end onto said second middle arm near said second opening of said second middle arm such that said second L-shaped latch may pivotably rotate and able to latch downwardly into one of said at least two recessed portions on said first base arm, at least one upper coupling bracket being connected between a first end portion of said rotating lever and proximate a notch position of said first latch by a first bolt and a second bolt respectively, at least one lower coupling bracket being connected between a second end portion of said rotating lever and proximate a notch position of said second latch by a third bolt and a fourth bolt respectively, whereby when a clock wise or counter clock wise pivotal force is applied, said first and second latches may lock or release, upwardly and downwardly respectively, into or out of said recesses on said first back arm and first base arm, respectively, depending upon the initial position when said rotating lever being connected with said coupling brackets.

21. The boat seat according to claim 20, wherein said latch locking mechanism has one upper and one lower bracket.

22. The boat seat according to 17, wherein said at least two recessed portions on said first base, arm are arranged such that at least two of said recessed portions on said first base arm are able to tilt and lock said seat into one of said first, second and third lockable positions.

23. The boat seat according to claim 17, wherein said middle arm further comprises a first and second end portion with a first slot and a second slot, respectively, and containing said locking mechanism, a first and a second piece of elastic locking materials being affixed onto the same surface side of said middle arm across said first and second lots respectively, whereby holding said first and second lock pins into place respectively, said middle arm being partially inserted in between said longer and shorter plates on said first back arm, through said first and second openings, on said first back arm and said first slot on said middle arm, said first back arm and said middle arm being engaged by a first mounting screw with a first nut, through said first opening on said top round portion of said first base arm and said second slot on said middle arm, said first base arm and said middle arm being engaged by a second mounting screw with a second nut, whereby said first back arm and first base arm may, without any initial limiting position and in any direction or order, freely pivotably rotate and slide relative to each other and be locked into said multiple lockable positions by said locking mechanism.

24. The boat seat according to claim 23, wherein said locking mechanism comprises a first lock pin and a second lock pin on said first middle arm adjacent said first and second slot, respectively, on an inner side of said first middle arm, both said lock pins protruding outwardly on both side surfaces of said first middle arm, whereby said first back arm and first base arm may be locked into one of said first, second, and third lockable positions by positioning said first lock pin and second lock pin into one of at least two recessed portions on said first back arm and one of said at least two recessed portions on said base arm respectively.

25. The boat seat according to claim 17, wherein said middle arm being a first middle arm having a first and second end portion with a first slot and a second slot, respectively, and containing said locking mechanism, and said first middle arm being partially inserted in between longer and shorter plates on said first back arm, through first and second openings on said -first back arm and said first slot on said first middle arm, said first back arm and said first middle arm being engaged by a first mounting screw with a first nut, through said first opening on said top round portion of said first base arm and said second slot on said first middle arm, said first base arm and said first middle arm being engaged by a second mounting screw with a second nut, whereby said first back arm and first base arm may, without any initial limiting position and in any direction or order, freely pivotably rotate and slide relative to each other and be locked into said multiple lockable positions by said locking mechanism.

26. The boat seat according to claim 25, Wherein said locking mechanism comprises a first lock pin and a second lock pin on said first middle arm adjacent said first and second slot, respectively; on an inner side of said first middle arm, both said lock pins protruding outwardly on same one side surface of said first middle arm, whereby said first back arm and first base arm may be locked into one of said first, second, and third lockable positions by positioning said first lock pin and second lock pin into one of at least two recessed portions on said first back arm and one of said at least two recessed portions on said base arm, respectively.

27. The boat seat according to claim 26, wherein said locking mechanism further comprises a first and second locking coil spring connected between said first mounting screw and said first lock pin and between said second mounting screw and said second lock pin respectively, whereby holding said lock pins in place.

28. The boat seat according to claim 1, wherein said pivot comprises:
   a second back arm;
   a second base arm; and
   a fourth middle arm connected between said second back arm and said second base arm whereby said second back arm and second base arm may, without any initial limiting position and in any direction or order, freely pivotably rotate relative to each other and be locked into one of said first, second, and third lockable positions.

29. The boat seat according to claim 28, wherein said second back arm comprising two generally parallel plates connected along a small peripheral edge, one plate of said second back arm being longer than the other, said longer plate providing an extension area for fastening said seat back, and said shorter plate having a generally round shape and having equally spaced multiple recessed portions for receiving a first gear locking mechanism, said second back arm having a first and second opening through said longer and shorter plates, respectively, are located at a geometrical center of said shorter plate.

30. The boat seat according to claim 28, wherein said second base arm comprising a first top round portion having a round shape and a base portion with an extension area for fastening said seat base, said second base arm having a first opening at a geometrical center of said top round portion and having equally spaced multiple recessed portions for receiving said first gear locking mechanism on an edge of said top round portion.

31. The boat seat according to claim 28, wherein said fourth middle arm includes a long plate having a first and a second opening near a first and second end portion respectively, and having a first gear locking mechanism, one plate of said second back arm being shorter than the other, said fourth middle arm being partially inserted in between said longer and shorter plates on said second back arm, through a first opening and a second opening on said second back arm and said first opening on said fourth middle arm, said second back arm and fourth middle arm being engaged by a first mounting screw and a first nut through which said fourth middle arm may freely rotate, similarly, through a second opening on said fourth middle arm and a first opening on said second base arm, said fourth middle arm and said second base arm being engaged by a second mounting screw with a second nut through which said second base arm may freely rotate, allowing said second back arm and said second base arm be tilted without any initial limiting position and in virtually any direction and in any order, whereby said second back arm and said second base arm may be locked into one of said first, second, and third lockable positions by said first gear locking mechanism.

32. The boat seat according to claim 31, wherein said first gear locking mechanism has at least one single gear.

33. The boat seat according to claim 31, wherein said first gear locking mechanism comprises a first generally round gear placed on a generally center position of said fourth middle arm, said first gear having a handle bar perpendicularly connected at the center position of said first gear, said first gear being connected to said fourth middle arm through an extendable pin mechanism such that said first gear may be pulled or pushed perpendicularly, outwardly or inwardly to respectively disengage or engage said second back arm and second base arm, said first gear defining at least two receiving cavities surrounding a center of said first gear for receiving at least one lock pin connected to said fourth middle arm on the same side surface where said first gear was placed, whereby allowing said second back arm and said second base arm to be tilted without any initial limiting position and in virtually any direction and in any order while said first gear being pulled out and being disengaged and, then locked into any position where the recesses located by engaging said first gear inwardly and placing said lock pin into one of said receiving cavities on said first gear.

34. The boat seat according to claim 28, wherein said fourth middle arm has a third lock pin.

35. The boat seat according to claim 1, wherein said pivot comprises:
   a third back arm;
   a third base arm; and
   a fifth middle arm connected between said third back arm and said third base arm whereby said third back arm and third base arm may, without any initial limiting position and in any direction or order, freely pivotably rotate relative to each other and be locked into one of said first, second, and third lockable positions.

36. The boat seat according to claim 35, wherein said third back arm comprising two generally parallel plates connected along a small peripheral edge, one plate of said third back arm being longer than the other, said longer plate providing an extension area for fastening said seat back, while said shorter plate having a generally round shape and having a plurality of equally spaced recessed portions for receiving a second gear locking mechanism, said third back arm having a first and second opening through said longer and shorter plates, respectively, located at a geometrical center of said shorter plate.

37. The boat seat according to claim 35, wherein said third base arm comprises a first top round portion having a generally round shape and a base portion with an extension area for fastening said seat base, said third base arm having a first opening at a geometrical center of said top round portion and having equally spaced multiple recessed portions for receiving said second gear locking mechanism on an edge of said top round portion.

38. The boat seat according to claim 35, wherein said fifth middle arm includes a long plate having a first and second opening near a first and second end portion, respectively, and having said second gear locking mechanism, said fifth middle arm being partially inserted in between a longer plate and a shorter plate on said third back arm, through a first opening and a second opening on said third back arm and said first opening on said fifth middle arm, said third back arm and said fifth middle arm being engaged by a first mounting screw with a first nut through which said fifth middle arm may freely rotate, similarly, through said second opening on said fifth middle arm and said first opening on said third base arm, said fifth middle arm and said third base arm being engaged by a second mounting screw with a second nut through which said third base arm may freely rotate, allowing said third back arm and said third base arm be tilted without any initial limiting position and in virtually any direction and in any order, whereby said third back arm and said third base arm may be locked into one of said first, second, and third lockable positions by said second gear locking mechanism.

39. The boat seat according to claim 38, wherein said second gear locking mechanism has at least two gears.

40. The boat seat according to claim 38, wherein said second gear locking mechanism comprises a second generally round gear and third generally round gear engaged with each other and placed on said fifth middle arm such that said second and third gears may engage with a plurality of recesses on said third back arm and third base arm respectively, said second gear having a handle bar perpendicularly connected at a center position of said second gear, said second gear being connected to said fifth middle arm through an extendable pin mechanism such that said second gear maybe pulled or pushed perpendicularly, outwardly or inwardly, to disengage or engage said third back arm and third base arm, respectively, said third gear being connected at a center position by a sixth screw with a sixth nut to said middle arm, said second gear having at least two receiving cavities surrounding a center of said second gear for receiving at least one lock pin connected to said fifth middle arm on a side surface where said second gear is placed, whereby allowing said third back arm and said third base arm to be tilted without any initial limiting position and in virtually any direction and in any order when said second gear is pulled out and disengaged and, then locked into any position where said recesses are located by engaging said second gear inwardly and placing said lock pin into one of said receiving cavities on said second gear.

41. The boat seat according to claim 35, wherein said fifth middle arm has a fourth lock pin.

* * * * *